US006141027A

United States Patent [19]

Akutsu et al.

[11] Patent Number: 6,141,027

[45] Date of Patent: Oct. 31, 2000

[54] IMAGE RECORDING METHOD FOR RECORDING A HIGH QUALITY IMAGE WITH AN AQUEOUS DYE SOLUTION AND ACCOMPANYING APPARATUS

[75] Inventors: Eiichi Akutsu; Shigemi Ohtsu; Lyong Sun Pu, all of Ashigarakami-gun, Japan

[73] Assignee: Fuji Xerox Co., Ltd., Tokyo, Japan

[21] Appl. No.: 09/121,555

[22] Filed: Jul. 23, 1998

[30] Foreign Application Priority Data

Aug. 4, 1997 [JP] Japan .................................... 9-209404

[51] Int. Cl.$^7$ ............................. B41J 2/385; G01D 15/06

[52] U.S. Cl. ......................................... 347/163; 106/31.43

[58] Field of Search ..................................... 347/163, 164, 347/165, 166, 140, 156; 106/31.43, 31.48

[56] References Cited

U.S. PATENT DOCUMENTS

| | | | |
|---|---|---|---|
| 3,010,883 | 11/1961 | Johnson et al. | 347/164 X |
| 3,011,963 | 12/1961 | Johnson et al. | 347/163 X |
| 3,054,731 | 9/1962 | Venables | 347/163 X |
| 3,662,395 | 5/1972 | Doi et al. | 347/156 X |
| 4,017,366 | 4/1977 | Hsieh et al. | 347/163 X |
| 4,752,801 | 6/1988 | Kando | 347/156 X |
| 4,754,294 | 6/1988 | Kato | 347/140 |
| 4,757,332 | 7/1988 | Yuasa | 347/140 |
| 5,360,472 | 11/1994 | Radigan, Jr. et al. | 106/31.43 X |
| 5,713,992 | 2/1998 | Satoh et al. | 106/31.48 |
| 5,993,525 | 11/1999 | Sano et al. | 106/31.48 |

FOREIGN PATENT DOCUMENTS

| | | |
|---|---|---|
| 57-209972 | 12/1982 | Japan . |
| 62-267767 | 11/1987 | Japan . |
| 4-9902 | 1/1992 | Japan . |
| 6-293125 | 10/1994 | Japan . |
| 7-181750 | 7/1995 | Japan . |

OTHER PUBLICATIONS

Tanemura, Hatsumi et al., "High Quality Color Copy System Using Photographic Process," Advance in Japan Hardcopy, Research Publication, 1989, pp. 229–232.

Caruthers, E.B. et al., "Modeling of liquid Toner Electrical Characteristics," IS&T's Tenth International Congress on Advances in Non–Impact Printing Technologies, 1994, pp. 204–209.

Usui, Minoru, "Developments in the New MACH (MLChips Type)," Advance in Japan Hardcopy, Research Publication, 1996, pp. 161–164.

The Society of Electrophotography of Japan, Research Discussion Proceedings, 1971, pp. 32–34.

The Society of Electrophotography of Japan, Research Discussion Proceedings, 1964, pp. 24–26.

*Primary Examiner*—Susan S. Y. Lee
*Attorney, Agent, or Firm*—Oliff & Berridge, PLC

[57] ABSTRACT

An image recording method and apparatus with at least one dye having a general formula dissolved in an aqueous liquid, an image supporting member and a counter electrode opposing the image supporting member placed in the aqueous liquid, and an electric current or electric field applied between the image supporting member and counter electrode according to an image pattern to electrochemically deposit an image forming material containing the dye onto a surface of the image supporting member to simply and safely form a high quality image.

19 Claims, 6 Drawing Sheets

IMAGE RECORDING METHOD FOR RECORDING A HIGH QUALITY IMAGE WITH AN AQUEOUS DYE SOLUTION AND ACCOMPANYING APPARATUS

BACKGROUND OF THE INVENTION

1. Field of the Invention

The present invention relates to a method for recording an image using a solution containing an aqueous dye and electrochemically depositing the dye to form the image, and an image recording apparatus suitable for the method.

2. Description of the Related Art

Many methods of using a liquid image forming material are known in image recording technologies used in offices. For example, silver salt recording technology, ink jet recording technology, and electrophotographic recording technology.

Printing technology using silver salt has been published in Tanemura Hatsumi et al., "HIGH QUALITY COLOR COPYING SYSTEM USING THE SILVER SALT PHOTOGRAPHIC METHOD", Advance in Japan Hardcopy '89, Research Publication, p229. Printing technology using liquid development electrophotographic technology has been published in E. B. Caruthers, et al., "Modeling of Liquid Toner Electrical Characteristics" Proceedings of IS & T 10th Int'l. Congress on Advances in Non-Impact Printing Technologies, p204 ('94). Printing technology using ink jet recording has been published in many technical reports such as Usui Minoru "Developments in New-system MACH" Advance in Japan Hardcopy '96, Research Publication, p161.

Regarding conventional technologies closely related to the present invention, there are also published, for example Japanese Patent Application Laid-Open (JP-A) No. 7-181750 or Japanese Patent Application Laid-Open (JP-A) No. 62-267767, wherein there is used an electrodeposition liquid in which a dye is dispersed in a liquid insulator to generate an electrical double layer., JP-A No. 4-9902, "Fine Pattern Forming Method" relating to an electrodeposition printing technology using a printing plate having an insulated pattern on an electrically conductive substrate, and JP-A No. 6-293125, "Electrodeposition Offset Printing Method and Printing Plate".

Further, there is also an electrolytic developing method as one conventional technology. For example, such a method is disclosed in The Society of Electrophotography of Japan, Research Discussion Proceedings, p32 (1971) and p24 (1964, 11). The electrolytic development method comprises reducing zinc oxide by application of a voltage of 10 V or higher, with simultaneous exposure to light. The electrons thus generated are shifted to a dissolved dye precursor to reduce the precursor, and color-developing and depositing on the surface of the reduced zinc film are carried out, thereby forming an image. This is different in the recording method.

Properties required for printing technology used in an office are, for example, a high color image quality of 600 DPI (dots per inch) or higher and multi-gradation, capability of printing on plain paper, image fastness as high as possible according to the printing method, a high degree of safety of the recorded matter and recording apparatus, as little waste as possible, and low running costs. However, the above-mentioned conventional technology cannot satisfy these requirements completely.

The recording method using silver salt, which is one of the conventional printing technologies, does not have problems of image quality or image fastness, but has a problem of its use at an office being inappropriate because of the use and disposal of chemically-active agent resulting from the chemical reaction associated with the printing process. Ink jet printing technology at high resolutions has the problem of compatibility between the realization of a nozzle having a small size and printing reliability. Electrophotographic technology does not have any problems with image quality, capability of printing on plain paper, or image fastness as high as can be gained according to the printing method, but has the following problems. That is, a large amount of energy is consumed in the fixing unit in an electrophotographic apparatus and the printing process thereof is complicated so that the size of the apparatus is large and safety and reliability problems arise.

In order to obtain an image having a high quality (resolution of a level of 1000 DPI, good color-reproduction, and multi-gradation) , the thickness of the image structure is preferably 2 microns or less, and more preferably 1 micron or less, in the light of the relationship between the range of color reproduction and sharpness of the image. Thus, the average particle size of the image forming material, which is a factor having an influence on the structure of the image, needs to be of a sub-micron order. However, when the average particle size of the image forming material is 5 microns or less, practical use of a powdery image forming material is difficult due to problems with the fluidity. In comparison, from this viewpoint, use of a liquid image forming material would be efficient. In the step of forming an image having a size of the order of several microns, from a technical point of view, highly accurate control of the pixel shapes is difficult within the minute range of the image forming material particles. Accordingly, from the viewpoint of controlling the coloring material accurately, it is considered to be a very effective method to use an aqueous dye solution having a molecular order size, i.e., the minimum particle size, as an electrodeposition material.

In the electrophotographic method using a liquid insulator developer disclosed in, for example JP-A No. 7-181750, the particle size of the image forming material is of a sub-micron order. As a result, high resolution can be realized, with high adaptability to record on plain paper. However, in this method a hydrocarbon solvent is used as a developer, thereby resulting in the serious problem of the safety of the vaporized gas of the solvent. Therefore the use of such a developer is severely restricted in certain nations.

In electrodeposition printing technology using a printing plate on which an insulator pattern is arranged on an electrically conductive substrate, as disclosed in JP-A No. 4-9902, complicated steps are necessary, for example the step of forming a non-image portion of an insulator resist beforehand by photolithography. As a result, it is difficult to change the image pattern for printing an image, at every printing. Furthermore, precision in the apparatus to be used is high, the apparatus is large in size, and many steps are necessary. Much waste is also generated. Therefore this method is used only when the apparatus is installed at a factory wherein satisfactory facilities are arranged and the printing operation is carried out therein. Additionally, the histeresis of the image forming step is liable to remain on the printing plate, so that capability of reproducing fine images is low. Moreover, image forming portions are concave, and consequently stick-selectivity of particles to the image forming portions by electrophoresis is weak and much liquid of the image forming material is liable to remain on these image forming portions, so that the viscosity of the image forming material is also weak. As a result, flow of the image forming material on the image forming portions and break of condensation of the material are easily caused, in the transferring step. This makes it difficult to obtain a high quality image.

As described above, the conventional image forming methods have not been able to satisfy the requirements for the recording method used in an office safely and with a simple apparatus.

In order to provide an image with high image quality (1000 DPI or higher and multi-gradation), it is necessary to use a liquid image forming material containing a fine particle dye, whose particle size is preferably 1 micrometer or smaller. Considering the installation of the apparatus at an office, the liquid used for the image forming material needs to have a high degree of safety, such as water. Since it is necessary for the recording method used at an office to easily prepare various sorts of recorded matters in small amounts and at low cost, any printing method using a printing plate which cannot be recycled is inappropriate. Therefore, in the commercial market, preferred is a recording system of inputting an image signal to make image information every recording process and, in outputting print information, transferring the image forming material in an image pattern onto a recording medium corresponding to a user's needs, such as plain paper, thereby performing recording.

SUMMARY OF THE INVENTION

In view of the above respective properties, an object of the present invention is to provide a method for recording an image with high image quality using a fine particle dye in a highly safe and simple manner; and an image recording apparatus which can be suitably used for the method.

The image recording method of the present invention is a method comprising the steps of: dissolving at least one dye represented by the following general formula (I) in an aqueous liquid; placing an image supporting member and a counter electrode opposing the image supporting member in the aqueous liquid; and applying an electric current or electric field between the image supporting member and counter electrode according to an image pattern to electrochemically deposit an image forming material containing the dye onto a surface of the image supporting member to form an image.

$$Ar^1N{=}N{-}J{-}X{-}(NR^1{-}L{-}NR^2{-}X)_n{-}J{-}N{=}N{-}Ar^2 \quad (I)$$

wherein each of $Ar^1$ and $Ar^2$ independently represents a substituted or unsubstituted aryl group. At least one of $Ar^1$ and $Ar^2$ has at least one substituent selected from a —COSH group and a —COOH group. J represents a group of the following formula (j).

(j)

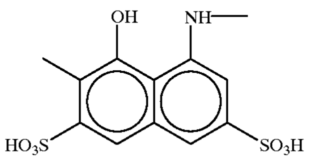

Each of $R^1$ and $R^2$ independently represents a hydrogen atom, a substituted or unsubstituted alkyl, a substituted or unsubstituted alkenyl group. L represents a bivalent organic linking group. X each independently represents a carbonyl group or a group of the formula (1), (2) or (3). n represents an integer of 0 or 1.

(1)

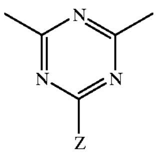

(2)

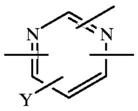

(3)

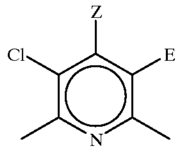

In the formulae (1) to (3), Z represents $—NR^3R^4$, $—OR^5$ or $—SR^5$; Y represents H, Cl, Z, $—SR^6$ or $—OR^6$; and E represents Cl or CN, in which $R^3$, $R^4$, $R^5$ and $R^6$ each independently represents a substituted or unsubstituted alkyl, a substituted or unsubstituted alkenyl, a substituted or unsubstituted aralkyl group, and $R^3$ and $R^4$ may form a 5- or 6-membered ring, together with a bonded N atom.

The image recording method of the present invention further comprises the step of transferring the image formed on the surface of the image supporting member onto a recording medium.

The image recording method of the present invention further comprises the step of changing the pH of the aqueous liquid existing near the surface of the image supporting member by the step of applying the electric current or field to form the image.

The image recording apparatus of the present invention comprises a liquid accommodating member which accommodate aqueous liquid in which at least one dye represented by general formula (I) is dissolved, an image supporting member placed in the aqueous liquid, a counter electrode placed in the aqueous liquid opposing the image supporting electrode, and an electric source which applies an electric current or field between the image supporting member and counter electrode according to an image pattern.

The image recording apparatus according to the present invention mainly comprises an image supporting member for generating an electrical image pattern, a solution in which the dye represented by general formula (I) is dissolved into an aqueous system, a jig for immersing the image supporting member into the dye solution, and a controller for the jig. The image of a dye on the image supporting member formed by this apparatus is transferred onto a media suitable for a user's needs to complete a document. Particularly when a laser light source is used as an input source to apply an image signal according to the electric current or field, an image having high resolution is easily formed.

The image recording method of the present invention is a method which comprises the steps of: placing an image supporting member through which flows an electric current according to an image signal, in the aqueous dye solution, and electrochemically depositing an image essentially consisting of the dye on the image supporting member according to the image electric current to form an image. The method further comprising a step of transferring the image onto a recording medium.

DESCRIPTION OF THE PREFERRED EMBODIMENTS

Figure 1:
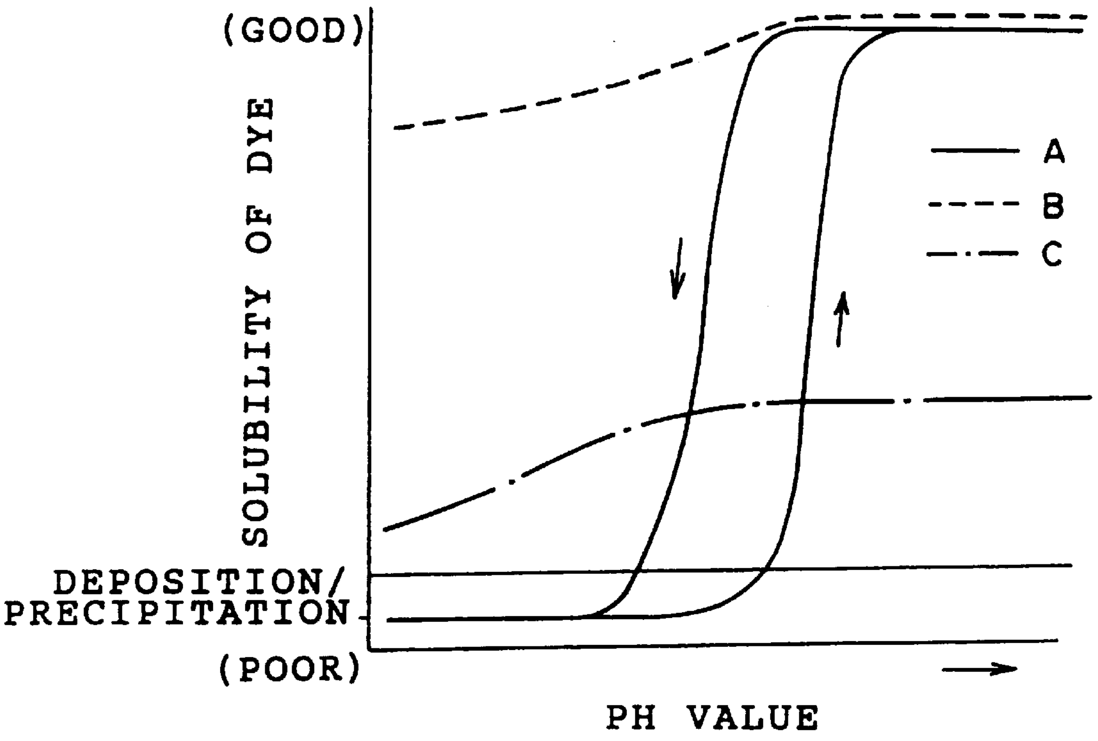
FIG. 1 is a graph showing the relationship between the change in pH of an aqueous dye solution and solubility of the dye.

The image recording method and apparatus will be described in detail below.

The image forming method according to the present invention uses a step of depositing the dye dissolved in the aqueous liquid on a surface of an image supporting member electrochemically by the action of an electric current or electric field applied between the image supporting member and a counter electrode according to a desired image pattern to form the image. The aqueous solution in which the dyes are dissolved is referred to as an "aqueous dye solution" or "electrodeposition aqueous dye solution" hereinafter.

Among the components of the aqueous dye solution, it is preferable to use a dye which can be reversibly changed between soluble and insoluble states in an aqueous liquid, depending on changes of the conditions such as pH and temperature. The most preferable dye is a dye represented by general formula (I). The change between soluble and insoluble states is preferably based on the change in pH, from the viewpoint of easiness of control. The main components of the aqueous dye solution are a dye having this specified chemical structure; and a liquid consisting essentially of water or an aqueous solvent, or a water-soluble resin whose solution state can be changed with the change in pH. The aqueous dye solution may include an additive, such as a wetting agent, a water-soluble thermoplastic resin, an emulsifier, a latex agent, solvents, a surfactant, a preservative, an anti-mold agent, and a pH adjusting agent in order to improve various properties of the solution.

The concentration of the dyes in the aqueous dye solution composition is from 1 to 40% by weight, and preferably from 3 to 18% by weight. A solid concentration of at least 1% by weight can provide an image with a desired optical density. The concentration of at most 40% by weight can provide an image without problems of an image fog generated in non-image forming portions and complicated handling of the aqueous solution due to its high viscosity and thixotropy.

The amount of the dye in the solid components of the aqueous dye solution may be from 10 to 70% by weight, and preferably from 30 to 50% by weight. The amount of at least 10% by weight can provide an image without too high gloss or low optical density. The amount of at most 70% by weight can provide an image without defects generated upon formation of an image layer or low fixing strength, or undesired color tone.

The volume resistivity of the aqueous dye solution is suitably $10^5$ Ω.cm or less, and preferably $10^3$ Ω.cm or less. Higher resistivity leads to high depositing voltage, so that there occurs marked bubbling near or at the electrode, or unstable depositing of the dye, resulting in scattering in the quality of the electrodeposited layer.

The viscosity of the aqueous dye solution is preferably from 1 to 2000 cps, and more preferably from 10 to 600 cps. Viscosity within this range can provide a suitable solution without the problem of scattered drops and decreased efficiency due to the larger load required to feed or stir the solution.

The pH value of the aqueous dye solution may be set within the range of [(pH at the precipitation (i.e., deposition) starting point)+2±2], preferably [(pH at the precipitation starting point)+2±1] in the case of the precipitating method using an anode precipitation type dye. On the other hand, when the precipitating method using a cathode precipitation type dye the pH value may be set within the range of [(pH at the precipitation starting point)−2±2], preferably [the (pH at the precipitation starting point)−2±1]. This keeps efficiency of producing the deposition layer high. When pH is set within the above-mentioned range, it is preferable that the aqueous dye solution is stable so as not to precipitate the dye in non-image forming portions and not to cause scattering in the amount of the precipitation. Furthermore, it is preferable in terms of the efficiency of producing the precipitation layer, a precipitating voltage, and the strength of the produced layer.

The solubility of dyes based on the change in pH, which is a criterion for selecting an appropriate dye, is shown in the graph of FIG. 1. FIG. 1 is a graph showing the relationship between solubility of various dyes and the pH of solutions containing the dyes. FIG. 1 shows a dye which is precipitated suddenly from a certain pH value as shown by the solid line A; a dye having a high solubility regardless of pH values as shown by the broken line B; and a dye which is insoluble regardless of pH values as shown by the chain line C. The characteristics also change, depending on the dyes and solvents used therefor. In the present invention, it is preferable that precipitation occurs steeply on the boundary of a certain pH as shown by the line A. It is ideal, in view of the stability of the resulting image, that re-dissolution is not effected steeply when the pH value changes and the precipitated condition is retained for a fixed period so that this graph A exhibits a so-called hysteresis curve. Therefore, it is preferable to select a combination of such a dye and a solvent having the above-mentioned properties.

This dye manifests high solubility in aqueous liquid when the pH is higher than 7. On the other hand, when the pH is not more than 4, the solubility reduces steeply. Thus, the dye is insolubilized in water, and a water-insoluble dye image having magenta color is formed. As this material system having a high S/N of this water insolubilizing phenomenon, compounds represented by general formula (1) have been found.

Specifically, it is preferable to use a dye which exhibits two consistent solubilities, that is, a solubility of 3 or more % by weight within some range of pH in a liquid whose main components are water or an aqueous solvent, and that of 0.1 or less % by weight within another range of pH in the liquid; has a good color tone for printing; and is highly safe. The dye system represented by general formula (I) has these characteristics. The changing properties of the solubility depending on the pH plays a very important role in image formation in this printing process.

In the general formula (I), each of $Ar^1$ and $Ar^2$ independently represents a substituted or unsubstituted aryl group, and at least one of $Ar^1$ and $Ar^2$ has at least one substituent selected from a —COSH group and a —COOH group. The —COSH group or the —COOH group contributes to the depositing properties. The substituted aryl group means a substituent such as an alkyl group having lower molecular weight may exist in this aryl group, provided that color tone, solubility and the depositing properties of this compound are not influenced, in addition to the above-mentioned substituents.

Each of $R^1$ and $R^2$independently represents a hydrogen atom, a substituted or unsubstituted alkyl, or a substituted or unsubstituted alkenyl group, and preferably a hydrogen atom or methyl group. An alkyl or alkenyl group may contain substituents which do not exert influence on color tone, solubility and the depositing properties of this compound. L represents a bivalent organic linking group, and X independently represents a carbonyl group or a group of the formula (1), (2) or (3). n represents an integer of 0 or 1.

J represents a group having the formula (j). J carries two —$SO_3H$ groups and these hydrophilic groups impart the solubility of the dye compound. Namely, in this compound, it is important that there is good balance between the above-mentioned —COSH group or —COOH group and the —$SO_3H$ group.

In the formulae (1) to (3), Z represents —$NR^3R^4$, —$OR^5$ or —$SR^5$; Y represents H, Cl, z, —SR or —$OR^6$; and E represents Cl or CN, in which $R^3$, $R^4$, $R^5$ and $R^6$ each independently represents a substituted or unsubstituted alkyl, a substituted or unsubstituted alkenyl, or a substituted or unsubstituted aralkyl group, and $R^3$ and $R^4$ may form a 5- or 6-membered ring, together with a bonded N atom.

Regarding the above-mentioned depositing and solubility properties, a compound of the general formula (I) exists constantly as a solution. Threfore, there are no problems due to reduced dispersibility, which is observed in the conventional techniques such as a combination of a dye dispersion and a resin for solidification. The solution of the compound may retain uniformity, and the compound deposited per se is a dye, resulting in constant color tones, while problems such as color mixing and the like are minimized.

Further, since a solution is extruded from a lump composed of flocculated dye when a deposited dye particle is flocculated, the water content in an image formed by the flocculated dye is controlled. Therefore, re-dissolution of the dye particle does not occur immediately, resulting in improved stability of the image, even if the pH value of the solution changes again, for example, application of electric voltage is stopped to transfer the formed image to a transferring means.

Specific examples of the dyes of the general formula (I) which can be used according to the present invention include, but are not limited to, the compounds having the chemical structures specifically listed below.

-continued
Compound-1:
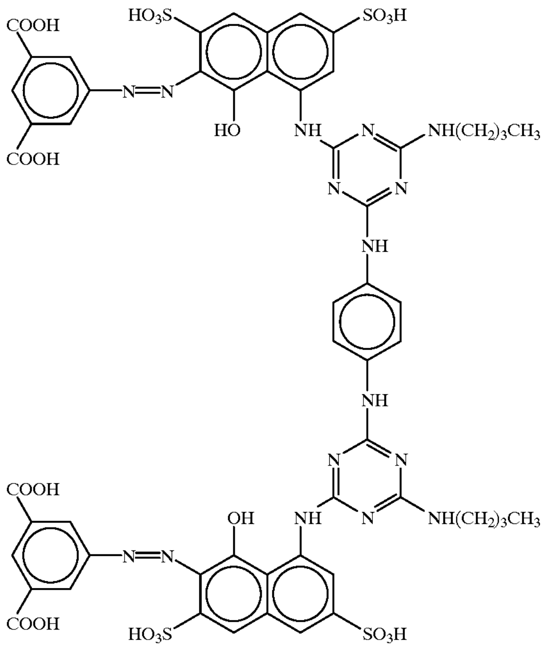
Compound-2:
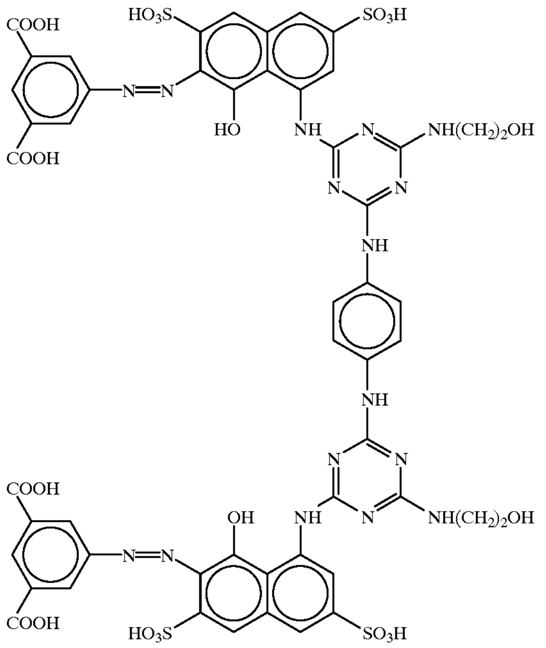
Compound-3:
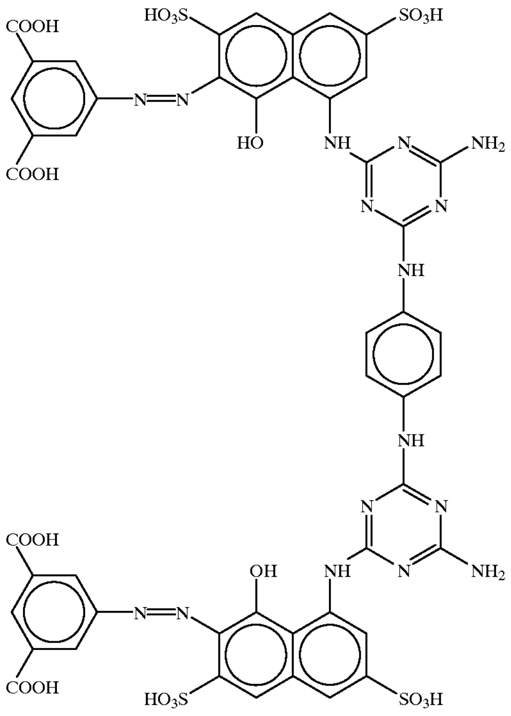
Compound-4:
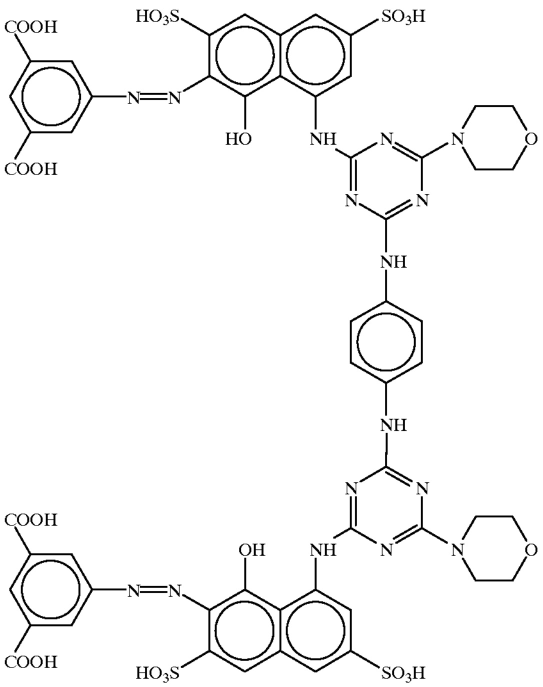

-continued
Compound-5:
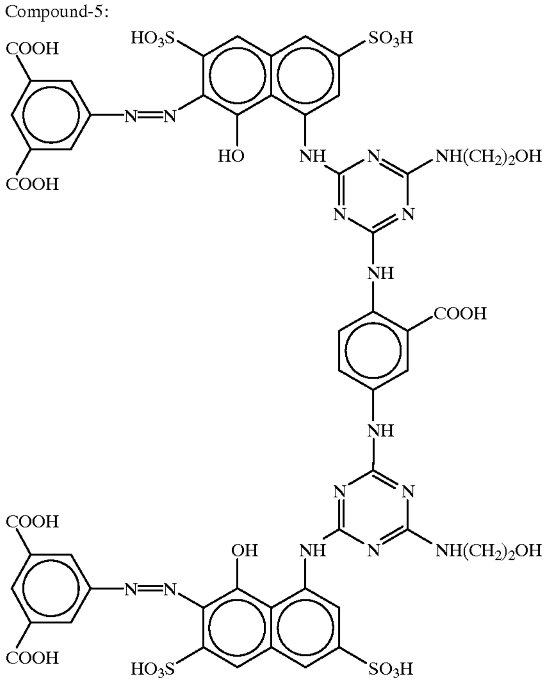
Compound-6:
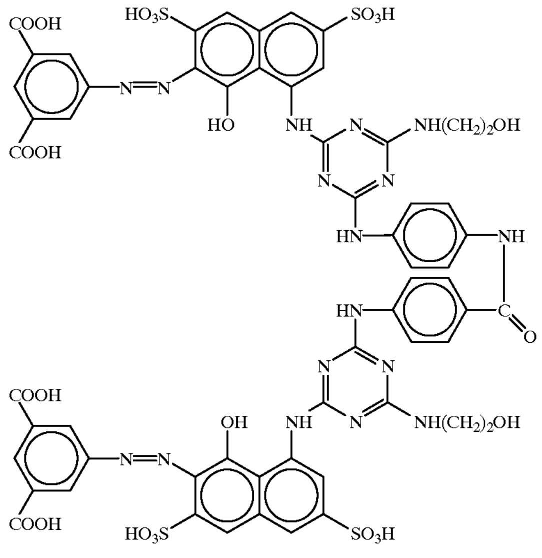
-continued
Compound-7:
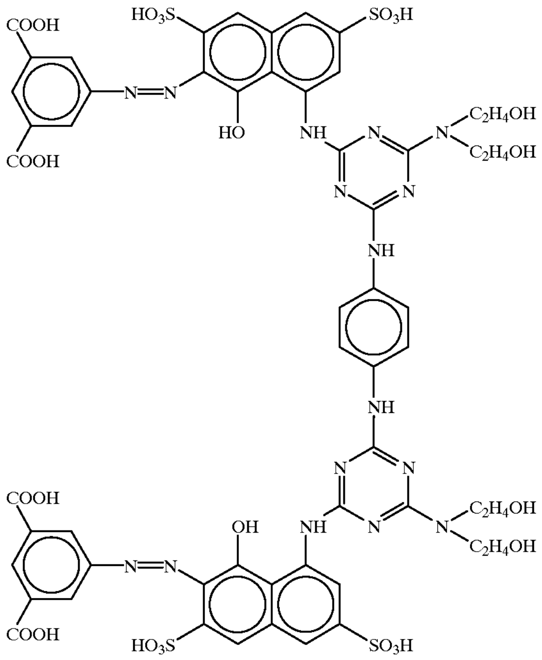
Compound-8:
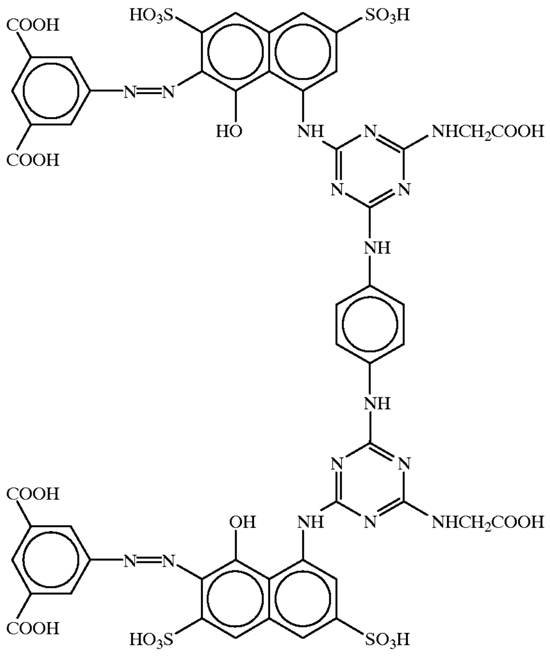

-continued
Compound-9:
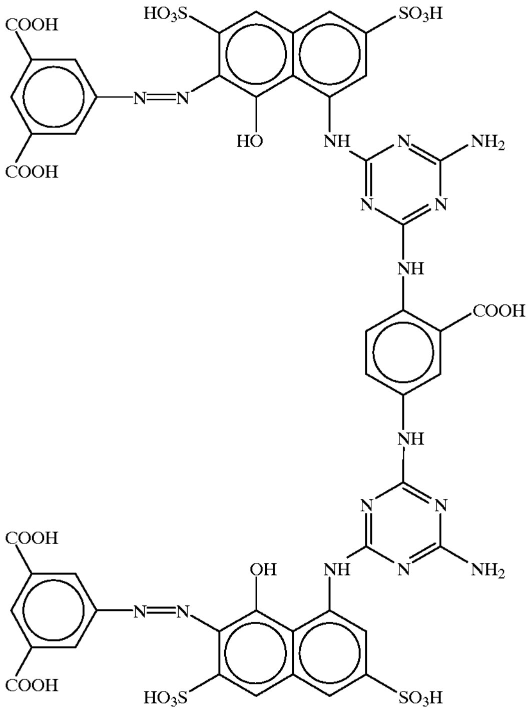
Compound-10:
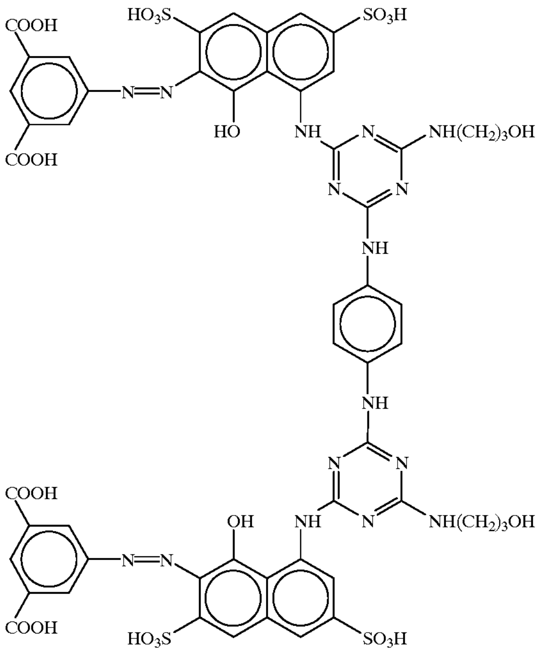
-continued
Compound-11:
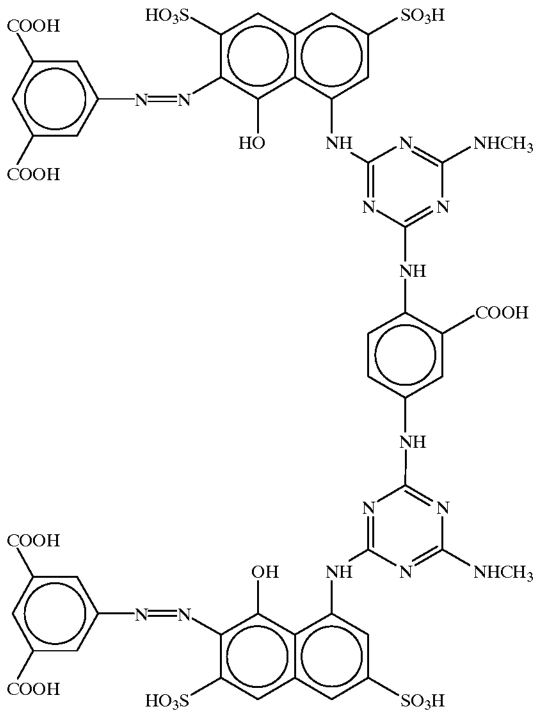
Compound-12:
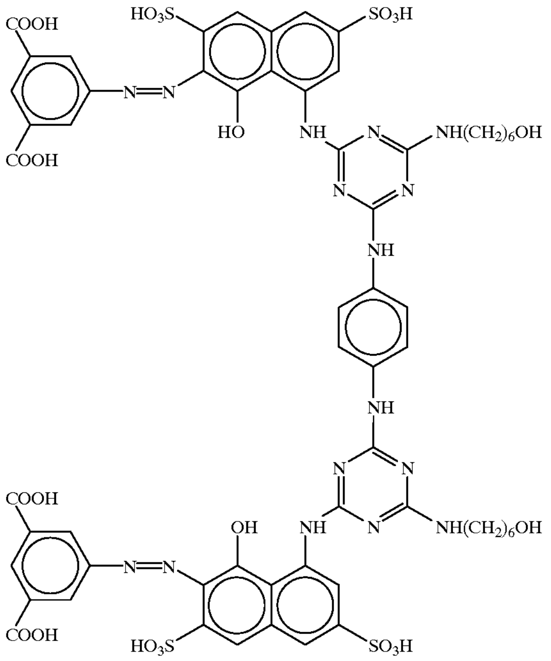

-continued
Compound-13:
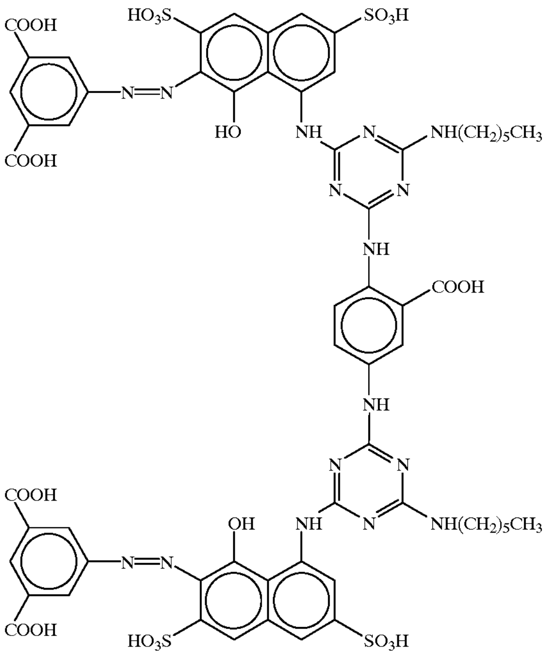
Compound-14:
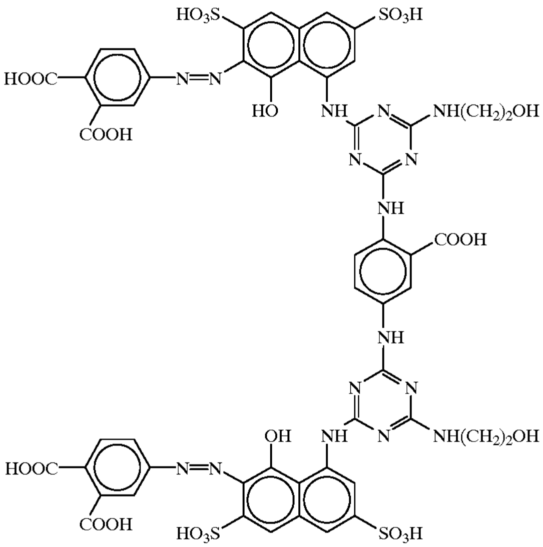
-continued
Compound-15:
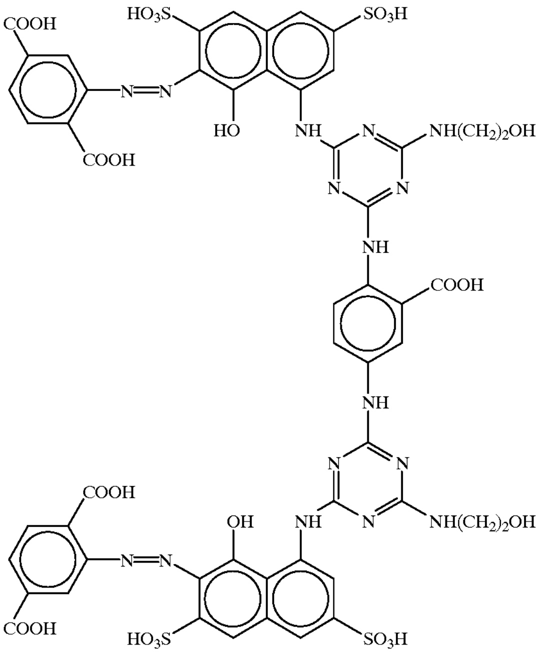
Compound-16:
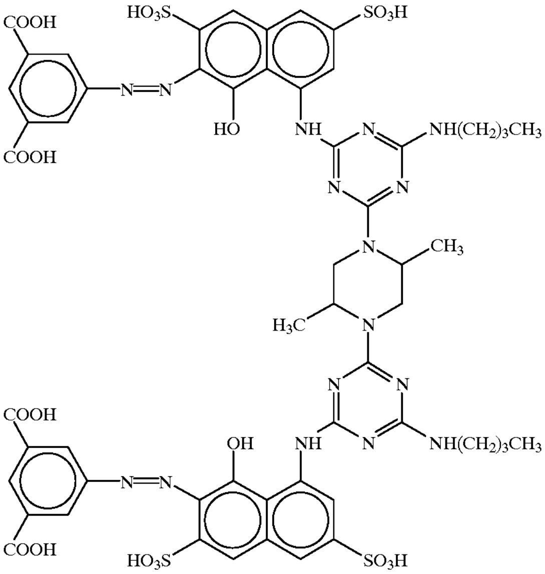

-continued
Compound-17:
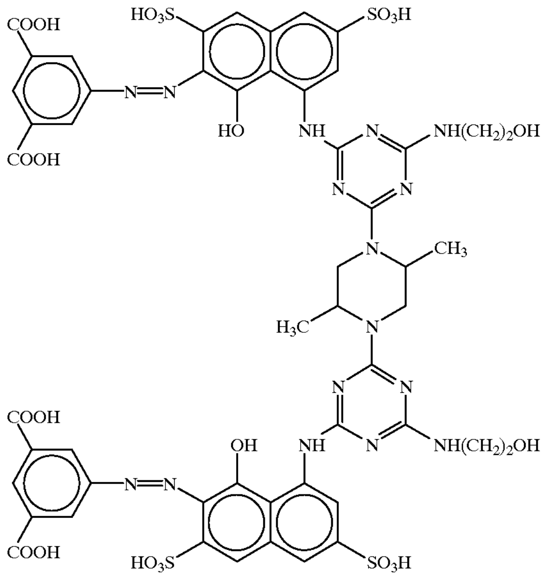
Compound-18:
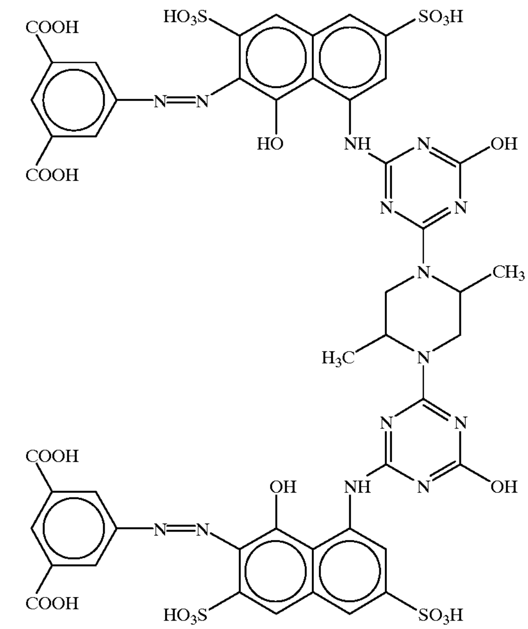
-continued
Compound-19:
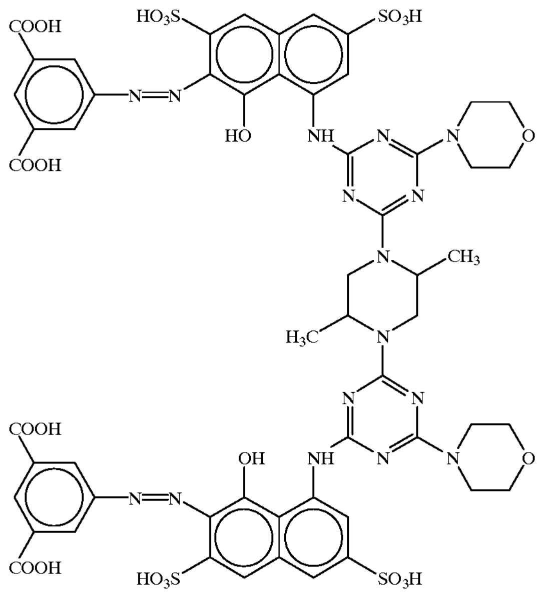
Compound-20:
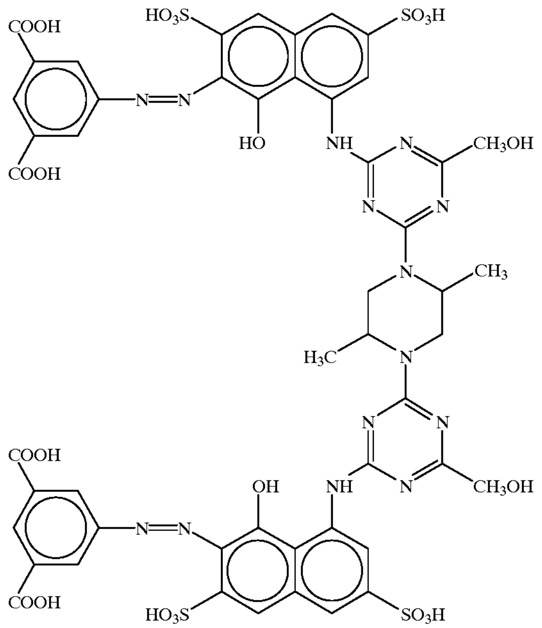

-continued

Compound-21:

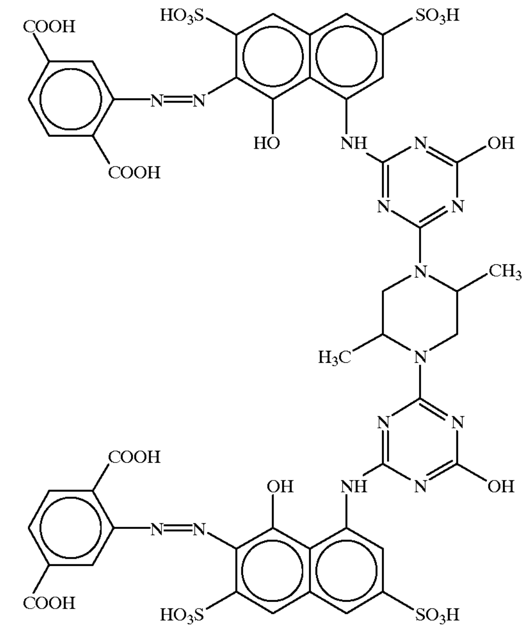

The image forming material of the present invention optionally contains the following dyes, in addition to these dyes of the general formula (I). Specific examples of a dye system include dyes, for example, an acidic dye, in particular an acidic dye having a carboxylic group in a free radical, such as Rose Bengal, erythrocin, gardenia blue dye; and a basic dye, for example, in particular, a basic dye having an amino or its derivative group, such as Victoria blue B, Rhodamine 6G. Specific examples of dyes and pigments having no or low water-solubility include inorganic pigments such as carbon black, titanium oxide, zinc white, red iron oxide, alumina white, aluminum powder, bronze powder, zinc oxide, barium sulfate, magnesium carbonate, ultramarine, lead oxide, cobalt blue, Prussian blue; organic pigments such as Toluidine Red, Permanent Carmine FB, Fast Yellow G, Bisazo Yellow AAA, Bisazo Orange PMP, Lake Red C, Brilliant Carmine 6B, Phthalocyanine Blue, Indanthron Blue, Quinacridone Red, Dioxadine Violet, Victoria Pure Blue, Alkali Blue toner, Aniline Black, Permanent Red 2B, Barium Lithol Red, Qunacridone Magenta, Naphthol Red HF4B, Phthalocyanine Green, Benzimidazolone Red; oil-soluble dyes such as Victoria Blue 4R Base, Negrosin, Nigrosin Base, C.I. Solvent Yellow 19, C.I. Solvent Orange 45, C.I. Solvent Red 8. Beside these, there may be used dispersing dyes, coloring lake pigments, resin powders containing a dye in a resin and the like.

A suitable aqueous solvent or solution to be used is one of or a combination of water, alcohols such as methanol, ethanol, butanol, isoproprylalcohol or the like, ketones such as acetone, methylethyl ketone or the like, amines such as ethanol amine, dimethylamine, triethanol amine or the like, acids such as acetic acid, sulfuric acid, phosphoric acid, oxalic acid, phthalic acid or the like. Mixed solvents or solutions containing water as the main component are especially useful from the viewpoint of safety, stability and cost.

The aqueous dye solution may contain a wetting agent in order to prevent deterioration of the solution caused by vaporization of aqueous solvent components. The added wetting agent is suitably a liquid which has high hydrophilicity and boiling-point, and a low vapor pressure, and which is azeotropic with water. The liquid essentially has high polarity, a boiling-point of 120° C. or higher with saturated vapor pressure of 100 mmHg or lower at room temperature under atmospheric pressure, preferably a boiling-point of 150° C. or higher with saturated vapor pressure of 60 mmHg or lower. Within the range, it is preferable in terms of the life time of the dispersing solution, and the stable deposition without changes of the solution properties. The amount of the wetting agent to be added is from 0.5 to 50% by weight, and preferably from 5 to 30% by weight. Specific and representative examples thereof include ethylene glycol, diethylene glycol, polyethylene glycol, glycerin, triethanolamine, methyl cellosolve, ethylcellosolve, butyl cellosolve, an ethyleneglycol diacetate and the like.

An ionic water-soluble resin additive which may be added to the aqueous dye solution plays an important role in improvement of adhesion of the dye to a recording medium and occurrence of precipitation and absorption. For the former, it is sufficient if the resin is a water-soluble resin. For the latter, the resin needs to be hydrophilic and have a molecular structure having a group which can be easily ion-dissociated in an aqueous liquid. More preferably, this additive is one by which deposition of the dye is easily caused while an electric double layer is compressed by change in the pH and the dissolved resin is condensed so as to assist the deposition.

Among such additives, a surfactant, a water-soluble oligomer or a polymer having a low degree of polymerization which have the above-mentioned ionic substituent are good in solubility stability and the layer-properties of the deposited layer. Examples of the water-soluble oligomer or the polymer having a low degree of polymerization include alkylalkyleneoxide carboxylate salts, alkyloxide carboxylate salts, alginic acid-modified carboxylate salts, carboxy-modified methylcellulose, polyacrylic acid-modified carboxylate, polymethacrylic acid-modified carboxylate salts, polyethyleneoxide-modified carboxylate salts, epoxy-modified carboxylate salts, polyacrylic acid-modified methylcelluose, amine-modified alginate salts, and amine-modified polyacryl.

By addition of the polymer additive, an electrolytic polymerizing material or an emulsifier, particles can be deposited to produce a deposition layer in a stable manner, with improved layer-properties of the deposited layer. The addition also gives hardness of a deposited image and a high advantage for controlling electric resistivity of the layer. The concentration of the additives in the solid components is from 0.2 to 60% by weight, and preferably from 2 to 35% by weight.

Representative examples of the polymer additives include gelatin, gum arabic, pectin, casein, starch, microcristalline cellulose, alginates, polyvinyl alcohol, vinyl acetate copolymers, polyacrylic acid copolymers, and methylcellulose derivatives.

Representative examples of the electrolytic polymerizing material include pyrrole, phenylene, diacethylene, aniline, thiophene and derivatives thereof.

Representative examples of the emulsifier include polyvinyl acetate emulsion, vinyl acetate copolymer emulsion, acrylate copolymer emulsion, and synthetic Rubber latex.

Besides these, it is permissible to add a preservative, an anti-mold agent, a very small amount of a surfactant, a pH adjusting agent, a liquid viscosity adjusting agent and the like. It is preferable to add the preservative and the anti-mold agent in particular to the aqueous solution, since the solution is easily deteriorated by breeding of organisms and molds.

The image supporting member used in the image recording method according to the present invention will be described in the following. The member having high smoothness of surface without steps or kinks, on which an image can be recorded, provides good printing properties. The low surface energy of the supporting member is critical when excellent transferring properties need to be easily obtained and when the image supporting member is used repeatedly.

Figure 2:
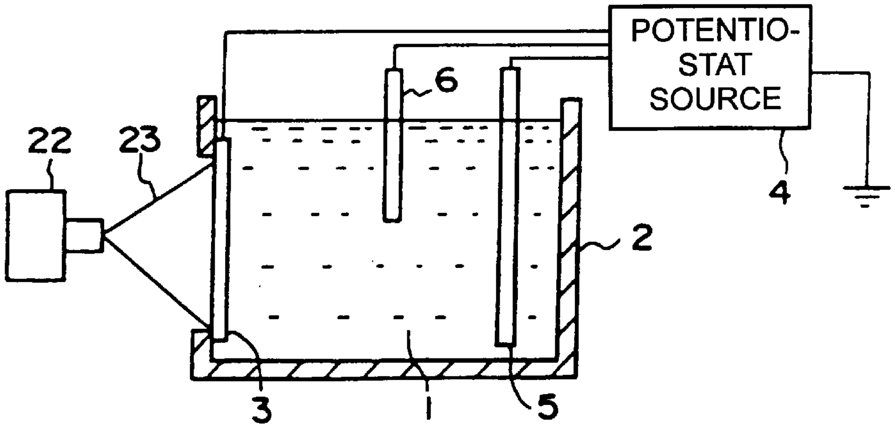
FIG. 2 is a schematic view of an image recording apparatus used for image recording in Example 1.

Next, an image recording apparatus which can be suitably used in the image recording method of the present invention will be described. FIG. 2 is a schematic view illustrating an image recording apparatus according to the present invention used in Example 1 described later. In this image recording apparatus, an image supporting member 3 is positioned inside an electrodeposition liquid bath 1 filled with an aqueous dye solution 1 for electrodeposition, so that the rear face of the member 3 is outside the liquid bath. An image signal can be inputted to the image supporting member 3 from its rear face, and a working electrode is attached to the member 3. A counter electrode 5 and a controlling electrode 6 using the salt bridge are disposed inside the bath 1. The image supporting member 3 is made by depositing a transparent conductive layer of ITO on a glass of a thickness of 4 mm and then depositing two organic photoconductive layers thereon. The ITO conductive layer functions as a working electrode. The surface of the organic photoconductive layers has smoothness without steps or kinks. The respective electrodes are connected to a potentiostat source 4. An image signal is inputted into a light image inputting section on the rear face of the image supporting member 3 while a voltage is applied between the working electrode and the counter electrode 5 by means of the potentiostat source 4. Thus, the dye in the dye solution is deposited on the surface of the image supporting member 3 to form an image. The image thus recorded may be transferred and fixed onto a transferring medium such as plain paper or a plastic layer, if desired.

Figure 3:
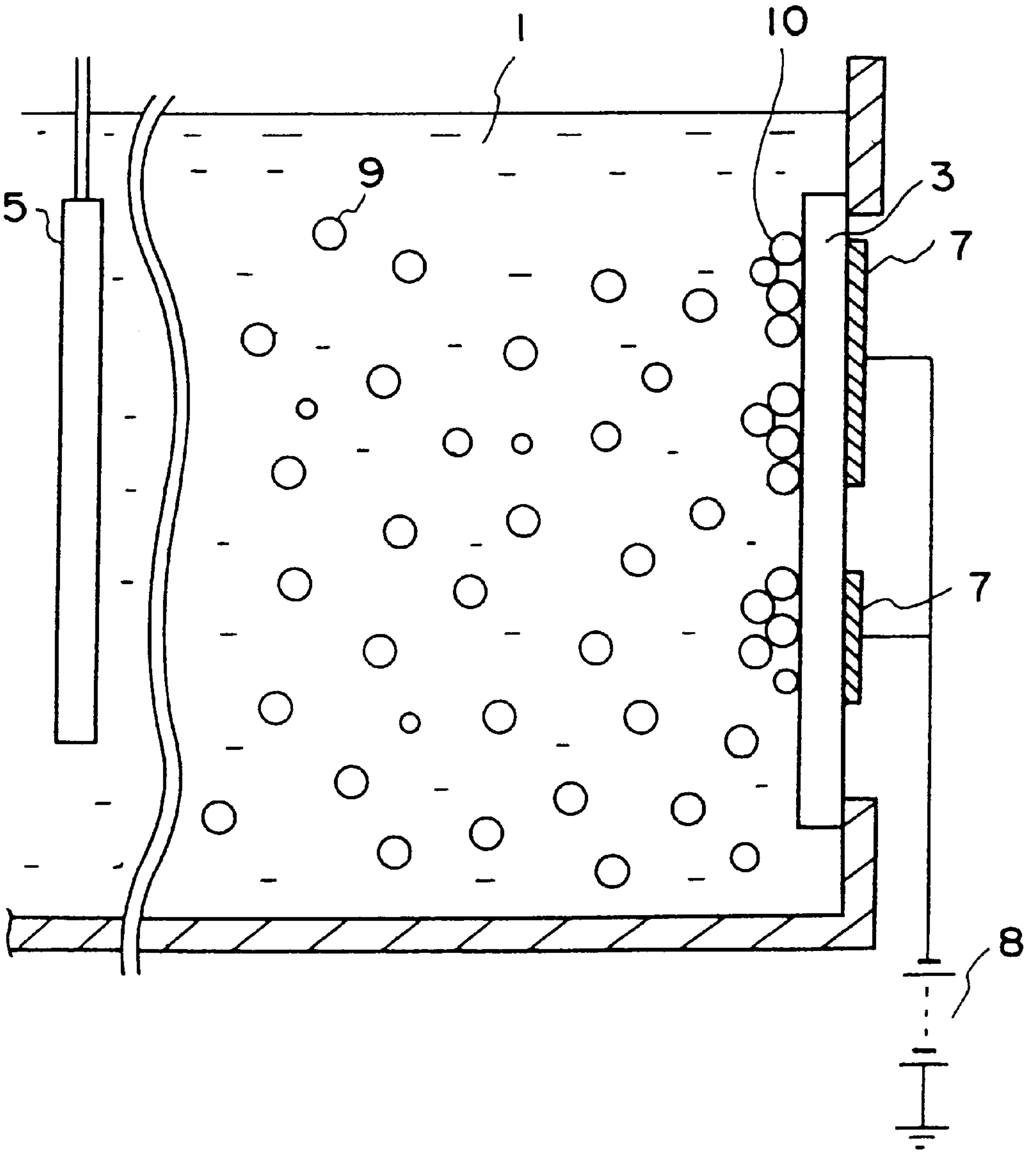
FIG. 3 is a schematic view of the phenomenon of deposition-recording of a dye.

The following will describe this image recording method more specifically. FIG. 3 is a schematic view illustrating an image recording phenomenon by electrochemical deposition. When a voltage is applied to a pseudo-current supplying electrode 7 arranged in an image-like form on an image supporting member 3 by means of a direct current power supply 8, the pH of an aqueous dye solution 1 around the electrode 7 is changed to deposit a dye 9 dissolved or dispersed in the solution 1 on the surface of the image supporting member 3. Thus, the dye is deposited and stuck in an image-like form onto the member 3 so that an image 10 is recorded.

Figure 4A:
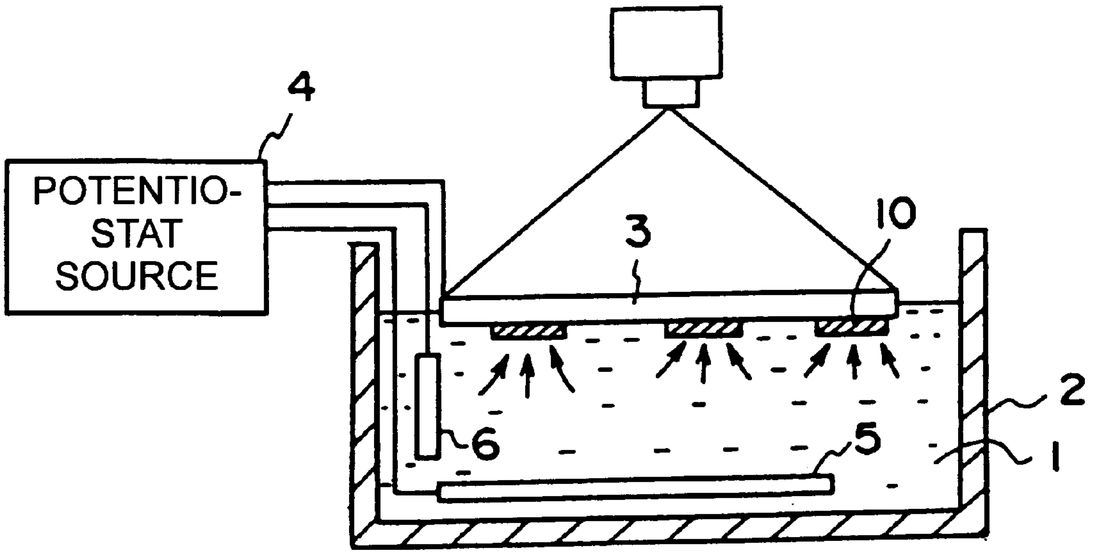
FIG. 4A is a schematic view showing the image recording process of the present invention.
Figure 4B:
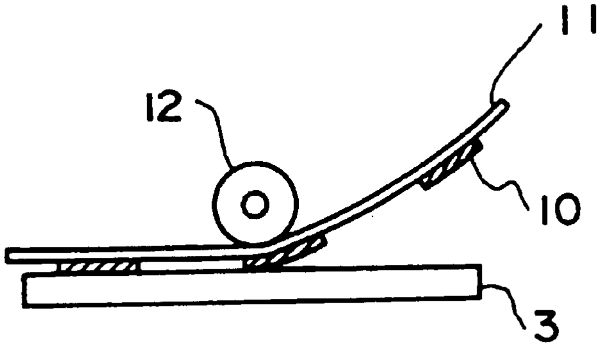
FIG. 4B is a schematic view showing an image transferring process.
Figure 4C:
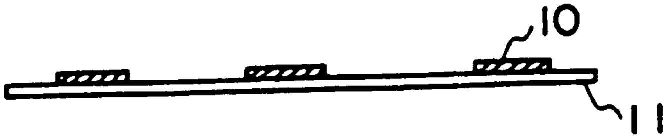
FIG. 4C shows an image which has been transferred and fixed onto a plain paper.

Next, a process for fixing the image thus recorded will be described. FIG. 4A is a schematic view showing the above-mentioned image recording process. An image 10 formed by a deposited dye is carried on the surface of an image supporting member 3. FIG. 4B is a schematic view showing an image transferring process. The image supporting member 3 is removed from the aqueous dye liquid 1. Plain paper 11 corresponding to a transferring substrate is laminated onto the image supporting member 3, pressed by a transfer roller 12, and further, preferably heated and pressed to transfer and fix the dye image 10 onto the plain paper 11. FIG. 4C shows the image 10 which has been transferred and fixed onto the plain paper 11, and thus, recording of an image onto the plain paper (transferring substrate) 11 is completed.

The image supporting member used in the image recording method according to the present invention will be described in the following. The member having high smoothness of the surface without steps or kinks, on which an image can be recorded, provides good printing properties, and good transferring properties. The low surface energy of the image supporting member is critical from the view point of preventing images from remaining when the image supporting member is used repeatedly to form different images.

Specifically, in order to provide good transferring properties, the surface roughness (Ra) of the member is from 0.01 to 1.5 μm and preferably from 0.06 to 0.5 μm. For the same purpose, the critical surface tension of the surface of the member is 30 dyne/cm or less, and preferably from 16 to 25 dyne/cm.

From the above-mentioned viewpoint, it is preferable to form a low surface energy layer on the surface of the image supporting member. The raw materials of the layer may be, for example fluorine-containing resins, fluorine-containing rubber (FEP), dimethylsiloxane type resins, silicone rubber, and waxes. Composite materials obtained by mixing these materials with conductive particles may be used, in order to control the electric resistivity of the low surface energy layer per se.

Treatment by, for example, application of dye-adhesion preventing agents or lubricants such as silicone oil, may be conducted to improve the effect of preventing offset of the dye-electrodeposited image. The thickness of the low surface energy layer is usually 3 μm or less, and preferably from 0.2 to 1.0 μm, from the viewpoint of energy efficiency.

The above-mentioned image supporting member is integrated with the image recording device, together with a power supplying means for supplying an electric current selectively from a current supplying section located at one peripheral side or both sides of a heat generating layer of the image supporting member to the heat generating layer present between a pattern electrode and a conductive layer, to provide an image transferring/fixing unit for transfer through heating or transfer through heating and applying pressure.

To the image recording device, an electrode having a dynamic contact in a roll shape or a tongue-like static contact is integrated. An electrode having the same dynamic contact or static contact as above is integrated with the image recording device at an appropriate position, preferably at the position opposed to a dynamic or static contact of the pattern electrode layer, of a conductive layer exposed at the peripheral side of the heat generator.

The inputting current which is sent by use of the dynamic or static contact from the pattern electrode layer through the heat generating layer to the conductive layer may be an alternating current, or a pulse current or a modulated current. The pulse current is preferable from the viewpoint of temperature-control.

As described above, in the unit in which the image supporting member according to the present invention is loaded, an electric current is locally applied to a portion of the pattern electrode layer of the unit so that the heat generating layer at that portion locally generates heat. Thus, in transferring a dye image supported on an image recording medium such as paper, only the required portion thereof is heated. For example, when an image transferring portion is heated and pressed, only the portion to which the pressure is applied is heated.

Since, in this case, the heat-generated portion of the image supporting member (i.e., the heat generating layer) comes very close to the untransferred dye image to be transferred on the image supporting member and the required portion is locally heated, the untransferred dye image can be immediately heated to an elevated temperature due to its small heat capacity. Namely, the heat generating layer may have excellent heat property such that the temperature of the heated layer will drop to about room temperature in a short time, due to its small heat capacity.

By using such a heat generating phenomenon, the total of generated heat energy can be made small to prevent a rise in temperature of the whole of the device. However, a cooling means may be equipped with the device such as an image transferring unit having the image supporting member according to the present invention to prevent a rise in temperature of the whole device, if necessary.

In some embodiments, the device having the image supporting member may comprise a temperature detecting device for detecting the temperature of the heat generator to easily control an amount of heat to be generated at the heat generating portion of the image supporting member and a supplying power controlling mechanism for controlling the electric power to be supplied to the heat generating layer depending on the temperature detected by the temperature detecting device, resulting in a good quality of a transferring image.

When the contact electrode portion is composed of, for example, a plurality of separated electrodes, the contact electrode portion may comprise a block separation circuit for separating an image signal into blocks corresponding to the separated electrodes; a setting circuit for detecting the image signal from the block separation circuit and environmental temperature and setting the amount of electric energy to be supplied into the respective separated electrodes (for example, a pulse width setting circuit or a pulse number/timing setting circuit), and a driving circuit for generating electricity for heat on the basis of the output signal from the setting circuit.

The image supporting member according to the present invention may comprise a heat generating portion formed by sandwiching a heat generating layer between a pattern electrode layer and a conductive layer. The pattern electrode layer, the conductive layer and the heat generating layer may be laminated on the substrate in the order of the pattern electrode, the heat generating layer, and the conductive layer, or in the order of the conductive layer, the heat generating layer, and the pattern layer.

The pattern electrode layer in the heat generating portion functions as an addressing/inputting electrode layer, that is a layer for addressing an input current sent into the heat generating layer in order to locally generate heat at the heat generating layer. The pattern electrode layer has a shape convenient for the addressing, for example, a belt-like shape, a line-like shape or a combination thereof, or has an electrode-shape separated into sectors of various shapes. One or both peripheral side(s) of the pattern electrode layer are at least exposed around one or both peripheral side(s) of the heat generator, so as to constitute a part of the current supplying portions for locally supplying an input current to a part of the pattern electrode layer.

Figure 5B:
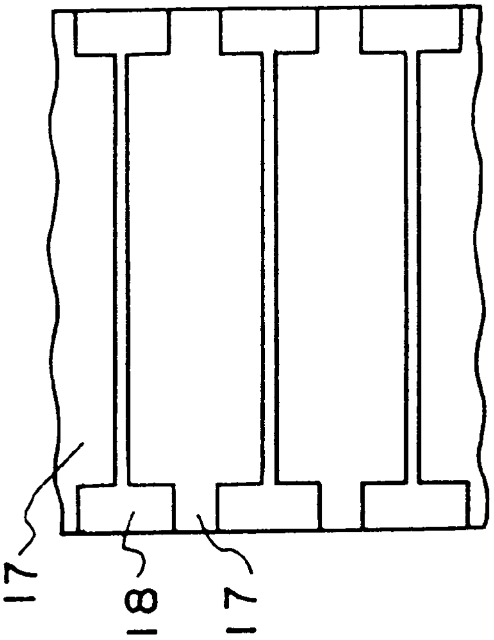
FIG. 5B is a front view of a patterned of a patterned ITO layer.
Figure 5A:
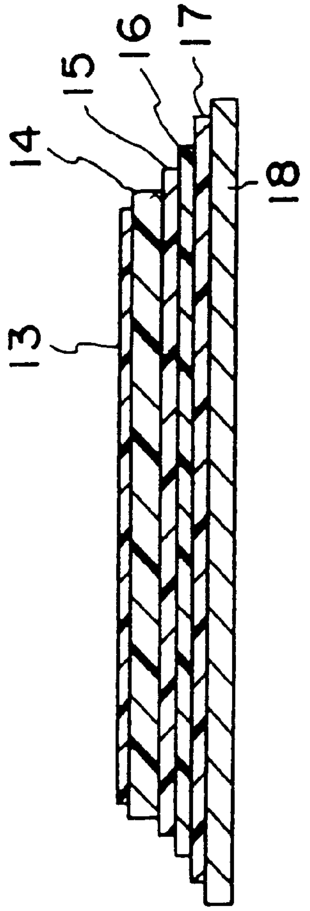
FIG. 5A is a cross sectional view of an image supporting member having a transparent heat generator.

The following will describe the image supporting member having a transparent heat generator specifically. FIG. 5A illustrates a cross sectional view thereof. FIG. 5B is a schematic, fragmentary view illustrating a patterned shape of a patterned ITO layer. A low surface energy layer 13 is deposited as the outer layer of the image supporting member. The image supporting member has, on a transparent substrate 18, a patterned ITO layer 17, a transparent heat-generating layer 16, an ITO layer 15 and a photoconductive layer 14 in this order. In this specific example, the patterned ITO layer 17 is deposited on the transparent substrate 18 as shown in FIG. 5(B).

Such a patterned electrode layer is any layer or layer having a good electric conductivity, for example a thin layer such as a sputtered layer or vacuum deposition layer of metals or conductive ceramics, or a screen printed layer of a conductive paste. The layer is made into a desired pattern by a method such as photolithography or screen printing. The thickness of the pattern electrode layer is usually 5 $\mu$m or less and preferably 1 $\mu$m or less. The thickness of 5 $\mu$m or less leads to the desired amount of leak heat from the electrode layer so that the temperature of the heat generating layer relative to an inputted current does not drop.

The conductive layer in the heat generator is a return electrode layer for returning an electric current which is supplied from the patterned electrode layer into the heat generating layer and which generates heat at the heat generating layer. In the same way as the patterned electrode layer, the conductive layer is usually a thin layer made of a material having a good electric conductivity. One or both peripheral sides of the layer are at least exposed around one or both peripheral sides of the heat generator, and constitute a part of the electric current supplying portion for returning the electric current supplied from the patterned electrode layer.

The conductive layer may also conventionally be a thin layer such as a sputtered layer or vacuum deposition layer of metals or conductive ceramics, or a screen printed layer of a conductive paste. The thickness of this layer is usually 5 $\mu$m or less, and preferably 0.5 $\mu$m or less. The thickness of 5 $\mu$m or less leads to the desired amount of leak heat from the electrode increases so that the temperature of the heat generating layer relative to an inputted current does not drop.

The heat generating layer in the heat generator is between the patterned electrode layer and the conductive layer, and is a layer which locally generates Joule' heat, by the inputted electric current addressed/inputted to the above-mentioned layers, at the portion to which the current is addressed/inputted. The heat generating layer may have heat resistance of 300° C. or more, and preferably 400° C. or more. It may have a volume resistivity from $10^{-3}$ to $10^{7}$ Ω.cm, and preferably from $10^{-1}$ to $10^{3}$ Ω.cm.

The heat generating layer can usually be made by mixing or combining one or more conductive materials such as conductive ceramics, conductive carbon materials or metals with one or more insulators such as insulating ceramics materials and heat-resistant resins.

Specific examples of the above-mentioned conductive materials include carbon and metals such as C, Ni, Au, Ag, Fe, Al, Ti, Pd, Ta, Cu, Co, Cr, Pt, Mo, Ru, Rh, W and In; and compounds such as $VO_2$, $Ru_2O$, TaN, SiC, $ZrO_2$, InO, $Ta_2N$, ZrN, NbN, VN, $TiB_2$, $ZrB_2$, $HfB_2$, $TaB_2$, $MoB_2$, $CrB_2$, $B_4C$, MoB, ZrC, VC, and TiC. Specific examples of the heat-resistant resins include polyimide resins, polyaramide resins, polusulfone resins, polyimidamide resins, polyester-imide resins, polyphenyleneoxide resins, poly-p-xylylene resins, polybenzimidazole resins, resins derived from these resins, various modified-resins, or composite materials thereof. Specific examples of the insulator for controlling resisitivity and bonding include ceramics such as AlN, $SiN_4$, $Al_2O_3$, MgO, $VO_2$, $SiO_2$, $ZrO_2$, $MO_2$, $Bi_2O_3$, $TiO_2$, $MoO_2$, $WO_2$, $NbO_2$ and $ReO_3$ and the above-mentioned heat-resistant resins.

Preferred examples of raw materials of the heat generating layer include carbon-dispersed polyimide resins, Ni particle-dispersed silicone resins, Ta—$SiO_2$ mixed ceramics and RuO—$SiO_2$. The thickness of the heat generating layer is usually 20 μm or less and preferably from 1 to 5 μm. Within the range, it is preferable in terms of heat generating efficiency and stability in resistance.

If the image supporting member is in a belt form, it is possible to record an image and transfer/fix the image onto a transferring medium successively. Thus, an image can be recorded efficiently.

In making the image supporting member in a belt form, its base material may be a polymer such as polyimide resin, a modified compound thereof, polyaramide resin, a modified compound thereof, silicone resin, or a modified compound thereof; or a material containing any one(s) thereof as the main component. When the image supporting member is in a belt form, the belt member can be bent to an acute angle and consequently the dye can be stripped off efficiently and the image on the member can be physically cleaned to a high degree. Thus, even if different images are formed every particle-deposition record step, it is possible to realize such a printing cycle that the hysteresis of the previously recorded image information does not remain.

Figure 6:
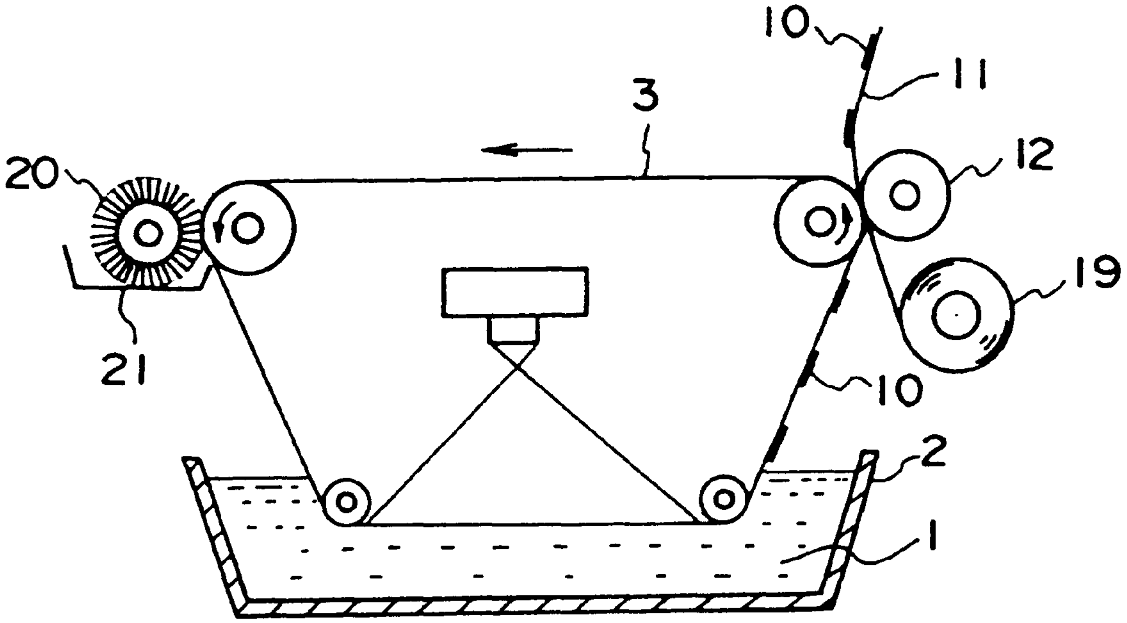
FIG. 6 is a schematic view of an embodiment of the image recording system according to the present invention, in which there is used an image recording apparatus having an image supporting member in a belt form.

FIG. 6 is a schematic view showing an embodiment of the image recording device according to the present invention. An optical signal is applied to an aqueous dye solution 1 to form an image on an image supporting member in the form of a belt. The image on the image supporting member is fed with the image 10 adhered to the surface of the member 3. The image 10 is pressed, at a transferring section, onto a paper 11 supplied from a paper roll 19 and passes between heating rolls 12. At that time, the image 10 is transferred. The dye remaining on the image supporting member 3 is removed with a cleaning blush 20 to be accumulated in a cleaning waste plate 21. The member 3 cleaned with the cleaning blush 20 is again used for recording an image.

For conducting image recording by transferring an image recorded on an image supporting member onto a transferring medium such as plain paper and the like, there is listed a method for transferring an image formed by deposition phenomenon on an image supporting member, utilizing electrostatic force, pressure, stickiness, chemical bonding force, wettability, and the like.

For removing an image particle remaining on a surface of an image supporting member (remaining deposited dye particle) after transfer, there are used known cleaning methods such as blade, fur brush, elastic roller, cleaning web and air knife methods and the like.

In the case of recording according to a light signal, the image supporting member may comprise an areal electrode layer and a photoconductive material layer, wherein an electric current flows at the surface of the image supporting member applied to light so that electrodeposition of a dye is caused.

In many cases, the voltage applied between the electrode and the image supporting member is a bias voltage less than 10 V, in the electrodeposition step. However, signals may be inputted by direct current pulses at short intervals or multiply inputted by direct current pulses at short intervals, in order to reproduce every pixel of the image sharply. The applied voltage is preferably a bias voltage less than 10 V, and a bias voltage of 5 V or less if more importance is attached to the quality of the formed layer. If a voltage below 10 V is applied, it is preferable that bubbles of gases are not vigorously produced from the surface of the electrode in an aqueous dye solution by electrolysis thereof. Thus, the distribution of the electric field on the surface of the electrode is uniform, so that the quality of the deposited layer per se becomes uniform and the surface of the deposited layer becomes even. As a result, it may reproduce an image having a desired fine pattern. In a conventional electrodeposition coating, the voltage applied for electrodepostion is 50 V or higher. If the applied voltage is low, the hardness of forming an electrodeposited layer decreases very much because of high resistivity of the layer as the formation of the layer advances. Thus, a required thickness of the layer cannot be obtained. In order to avoid this, a high voltage is applied so that bubbles are vigorously generated by electrolysis. By the bubbles, the solution is stirred near the surface of the electrode so as to bring this surface into contact with a fresh of the solution. Thus, a thickness (in general 20 μm or more) necessary for electrodeposition coating is obtained.

The object of the present invention is to reproduce a high quality image. Therefore, in order to reproduce a fine image pattern of thickness of 2 μm or less, the production of bubbles by electrolysis of the aqueous dye solution must be prevented. If any, the production must be controlled to such a level that it does not influence on the reproduction of the fine image pattern. Therefore, the voltage to be applied is a voltage below 10 V. If more importance is attached to the image quality, a direct current electric field of 5 V or less is applied. The voltage applying means may be a tri-electrode type means considering the stability of the voltage.

In order to keep uniformity of the properties of the aqueous dye solution in a bath, preferably, the solution in the bath may be stirred to easily deposit a layer having uniformity. However, vigorous stirring should be avoided since such stirring causes the production of the layer to be delayed and the solution to be scattered.

Control of temperature of the aqueous dye solution makes it possible to obtain a more uniform layer having a good quality. Since the precipitation or deposition phenomenon per se is affected by the temperature of the solution, it is preferable to provide a solution temperature controlling system with especially high precision when attempting to reproduce a high quality image.

Figure 8:
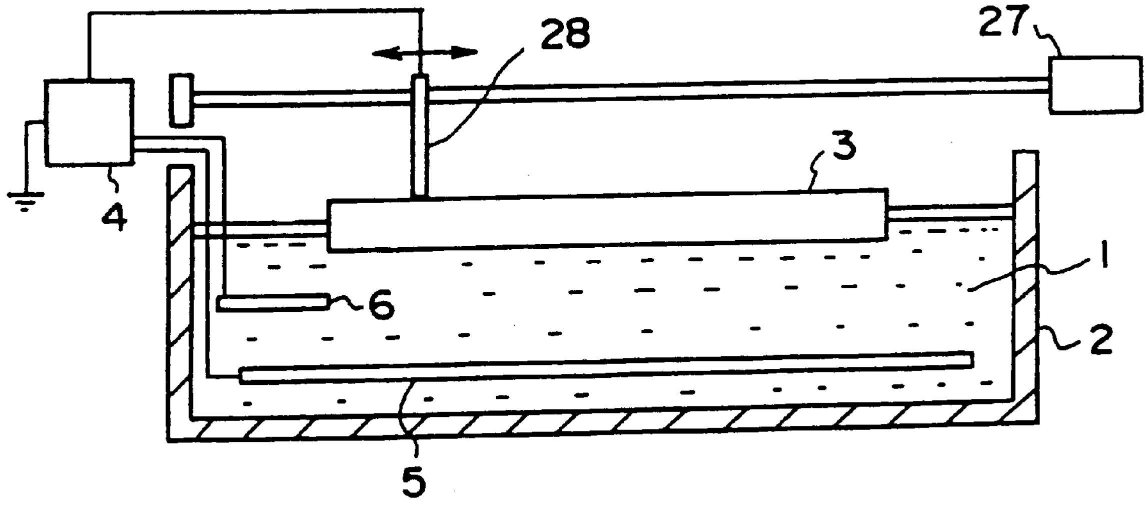
FIG. 8 is a schematic view showing an image recording apparatus having a recording LED head, which is used for the image recording in one embodiment of the present invention.

An image recording apparatus as shown in FIG. 8 will be described. In this apparatus, an image supporting member 3, a counter electrode 5 and a controlling electrode 6 using a salt bridge are arranged inside a bath containing a dye solution 1. The image supporting member 3 is fixed with a fixing jig for the image supporting member 3, such that one surface of the image supporting member 3 is immersed into the solution 1 with another surface thereof being out of the solution 1. The image supporting member 3 comprises a working electrode attached thereto and an image signal could be inputted from the rear of the member 3. The member 3 is made of a laminated structure having, on a quartz plate of 1 mm, a transparent conductive layer of ITO as the working electrode, and two organic photoconductive layers having smooth surfaces in this order. Each electrode is electrically connected to a potentiostat source 4. An image signal from an LED printing head 28 which is controlled by a printing head scanning system 27 is inputted to a photo image inputting portion displaced on the rear surface of the member 3 while a DC pulse voltage (for example, 2.0 V, with a pulse width of 4 ms/pulse cycle 10 ms) is applied between the working electrode and the counter electrode 5 with the potentiostat source 4. An image pattern is formed on the member 3 according to the image signal applied from the LED printing head 28 and printing head scanning system 27. An image will be formed on the surface of the member 3, which is immeresed in the solution 1, by depositing dyes of the present invention according to the image pattern while applying the DC voltage.

EXAMPLES

The following examples further illustrate the present invention but do not limit the scope thereof.

Example 1

7 parts by weight of a dye, compound-1 having the aforementioned chemical structure, 3 parts by weight of diethyleneglycol, 3 parts by weight of isopropanol, and 85 parts by weight of distilled water were mixed. This mixture was heated at 50° C. for 1 hour while being vigorously stirred with a propeller to prepare an aqueous dye solution. Into this solution was dropwise added a diluting mixture solution containing 100 parts by weight of distilled water, 10 parts by weight of glycerin, 6 parts by weight of a water-soluble acrylic resin, 2 parts by weight of sodium polyoxyethylenealkylether carboxylate, 2 parts by weight of sodium polyethyeleneglycol dicarboxylate and 0.8 parts by weight of an anti-mold agent (Proxycel XL-2, manufactured by ICI Inc.) while the solution was stirred with a propeller, to prepare an electrodeposition aqueous dye solution. The pH of this solution was adjusted to 7.5 with a hydrochloric acid solution and a sodium hydroxide solution. The starting point of the dye precipitation was a pH of 5.0. The volume resistivity of this solution was $3.9\times10^2$ Ω.cm.

The image recording apparatus was used as illustrated in FIG. 2 and this solution was used to form an image. As shown in FIG. 2, the image supporting member 3 to which an image signal could be inputted from its rear surface and to which a working electrode was attached was arranged inside an electrodeposition bath 2 containing the solution 1 as prepared above, so that the rear surface of the member 3 would be outside the bath 2. The counter electrode 5 and the controlling electrode 6 using the salt bridge were arranged inside the bath 2. This image supporting member 3 was made of a laminated structure having, on a glass plate of a thickness of 3 mm, a transparent conductive layer of ITO and two organic photoconductive layers in this order. The ITO conductive layer functioned as the working electrode, and the surface of the organic photoconductive layers had smoothness without steps or kinks. The critical surface tension of this surface was 26 dyne/cm. The respective electrodes were electrically connected to a potentiostat source. An image signal was inputted to a photoimage inputting portion placed on the rear surface of the image supporting member 3 while a DC voltage of 1.3 V was applied for 12 seconds between the working and counter electrodes with the potentiostat source.

After the process was completed to form an image, the image supporting member 3 was removed from the solution. It shows that a magenta image of a high quality having an optical image density of 1.36 was formed on the surface of the member 3.

Example 2

10 parts by weight of a dye, compound-2 having the aforementioned chemical structure, 5 parts by weight of diethyleneglycol, 10 parts by weight of isopropanol, and 80 parts by weight of distilled water were mixed, and vigorously stirred with a propeller for 1 hour to prepare an aqueous dye solution. Into this solution was dropwise added a diluting mixture solution consisting of 200 parts by weight of distilled water, 5 parts by weight of polyoxyethylene-alkylphenyl ammonium carboxylate, 6 parts by weight of a water-soluble acrylic resin, and 0.5 parts by weight of an anti-mold agent (Proxycel XL-2, manufactured by ICI Inc.) while the solution was stirred with a propeller. Thus, an electrodeposition aqueous dye solution was prepared. The pH of this solution was adjusted to 7.1 with a phosphoric acid solution and an ammonium solution. The starting point of the dye precipitation was a pH of 5.3. The volume resistivity of this solution was $9.3\times10^2$ Ω.cm.

Figure 7:
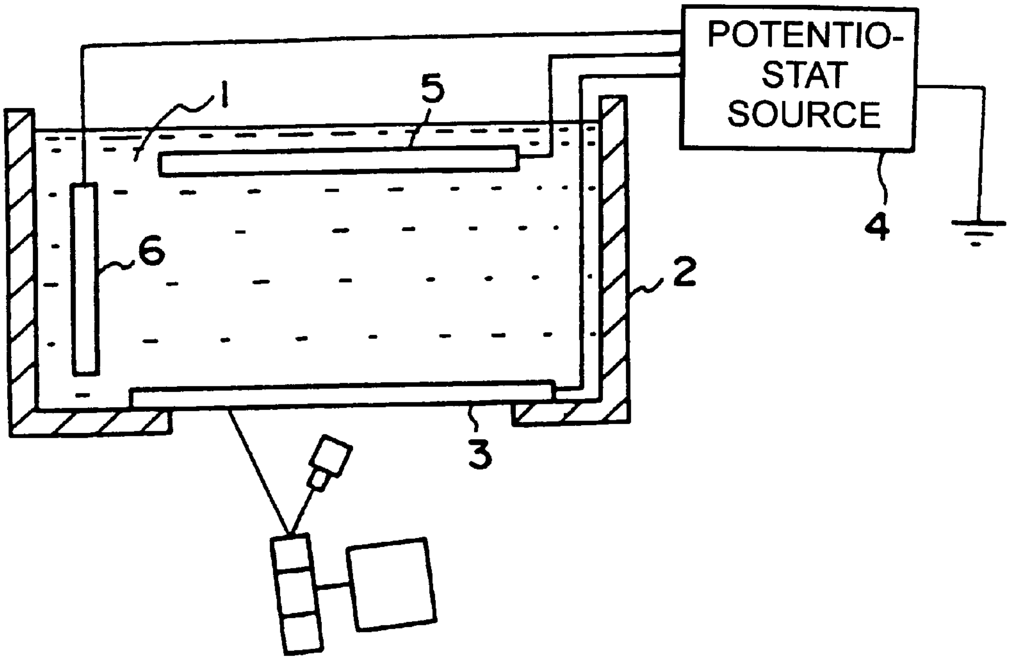
FIG. 7 is a schematic view showing an image recording apparatus having a laser generating device, which is used for the image recording in Example 2.

The image recording apparatus was used as illustrated in FIG. 7. The image supporting member 3 to which an image signal was able to be inputted from its rear surface and to which a working electrode was attached was arranged inside an electrodeposition bath 2 containing the solution 1 as prepared above, so that the rear surface of the member 3 would be outside the bath 2. The counter electrode 5 and the controlling electrode 6 using the salt bridge were arranged inside the bath 2. This image supporting member 3 was made of a laminated structure having, on a glass plate of a thickness of 4 mm, a transparent conductive layer of ITO and two organic photoconductive layers in this order. The ITO conductive layer functioned as the working electrode, and the surface of the organic photoconductive layers had smoothness. The respective electrodes were electrically connected to a potentiostat source. An image signal was inputted a photoimage inputting portion placed on the rear surface of the member 3 with a He—Ne laser ray 23 and radiated from a laser source 22 while a DC pulse voltage of 2.0 V (pulse width 5 ms/pulse cycle 8 ms) was applied between the working and counter electrodes with the potentiostat source 4.

After the process was completed to form an image, the image supporting member 3 was removed from the solution. It shows that a magenta image of a high quality having an optical image density of 1.42 was formed on the surface of the member 3.

Example 3 and 4

Ten parts by weight of a specific dye, compound-4 having the aforementioned chemical structure, 10 parts by weight of isopropanol, and 90 parts by weight of distilled water were mixed. This mixture was vigorously stirred with a propeller for 0.5 hours to prepare an aqueous dye solution.

Into this solution was dropwise added a pre-obtained mixture comprised of 5 parts by weight of Carmine 6B (C.I. Pigment Red 57:1), 15 parts by weight of polyoxyethylene-alkylphenyl lithium acetate, and 20 parts by weight of a water-soluble acrylic resin aqueous solution (30% by weight of its solid component). The resulting mixture was dispersed with a homogenizer-dispersing device for 4 minutes to prepare a dispersed solution. Into this solution was dropwise added a diluting mixture solution comprised of 100 parts by weight of distilled water, 10 parts by weight of diethyleneglycol, 10 parts by weight of ethyl cellosolve and 0.5 parts by weight of an anti-mold agent (Proxycel XL-2, manufactured by ICI Inc.) while the solution was somewhat vigorously stirred with a propeller. Thus, an electrodeposition aqueous dye solution was prepared. The pH of this solution was adjusted to 6.7 with a phosphoric acid solution and a lithium hydroxide solution. The starting point of the dye precipitation was a pH of 4.6. The volume resistivity of this solution was $3\times10^3$ Ω.cm.

The image recording apparatus as illustrated in FIG. 7 (Example 2) was also used. The image supporting member to which an image signal could be inputted from its rear surface and to which a working electrode was attached was arranged inside an electrodeposition bath containing the solution as prepared above, so that the rear surface of the member would be outside the bath. The counter electrode and the controlling electrode using the salt bridge were arranged inside the bath 2. This image supporting member was made of a laminated structure having, on a quartz plate of a thickness of 2 mm, a transparent conductive layer of ITO, and two organic photoconductive layers in this order. The ITO conductive layer functioned as the working electrode, and the surface of the organic photoconductive layers had smoothness. The respective electrodes were electrically connected to a potentiostat source. An image signal was inputted to a photoimage inputting portion placed on the rear surface of the member with a He—Ne laser ray while a DC pulse voltage of 1.8 V (pulse width 5 ms/pulse cycle 10 ms) was applied between the working and counter electrodes with the potentiostat source.

After the process was completed to form an image, the image supporting member was removed from the solution. It shows that a magenta image of a high quality having an optical image density of 1.23 was formed on the surface of the member 3.

When a DC pulse voltage of 2.1 V (pulse width 7 ms/pulse cycle 10 ms) was applied between the working and counter electrodes to record an image in the same manner as described above, it was verified that a magenta image of a high quality having an optical image density of 1.36 was formed on the surface of the image supporting member.

Example 5

10 parts by weight of a specific dye, compound-13 having the aforementioned chemical structure, 10 parts by weight of polyethyleneglycol, 5 parts by weight of polymethylacrylate ammonium dicarbonate, 5 parts by weight of polyoxyethyelenalkylphenyl ammonium carbonate, 10 parts by weight of butanol, and 90 parts by weight of distilled water were mixed. This mixture was heated at 60° C. for 2 hours while being stirred with a propeller, to prepare an aqueous dye solution.

Into this solution was dropwise added a pre-obtained mixture comprised of 5 parts by weight of Quinacridone (C.I. Pigment Red 122), and 25 parts by weight of a water-soluble acrylic resin aqueous solution (30% by weight of its solid component). The resulting mixture was dispersed with a ball mill-dispersing device for 24 hours to prepare a dispersed solution. Into this solution, added were dropwise a diluting mixture solution comprised of 70 parts by weight of distilled water, 6 parts by weight of glycerin, and 0.5 parts by weight of an anti-mold agent (Proxycel XL-2, manufactured by ICI Inc.) while the solution was stirred with a propeller. Thus, an electrodeposition aqueous dye solution was prepared. The pH of this solution was adjusted to 6.0 with a phosphoric acid solution and an ammonium solution. The starting point of the dye precipitation was a pH of 5.3. The volume resistivity of this solution was $5\times10^2$ Ω.cm.

The same image recording apparatus was used as shown in FIG. 7 (Example 2). The image supporting member to which an image signal could be inputted from its rear surface and to which a working electrode was attached was arranged inside an electrodeposition bath containing the solution as prepared above, so that the rear surface of the member would be outside the bath. The counter electrode and the controlling electrode using the salt bridge were arranged inside the bath 2. This image supporting member was made of a laminated structure having, on a quartz plate of a thickness of 4 mm, a transparent conductive layer of ITO, and two organic photoconductive layers in this order. The ITO conductive layer functioned as the working electrode, and the surface of the organic photoconductive layers had smoothness. The respective electrodes were electrically connected to a potentiostat source. An image signal was inputted to a photoimage inputting portion placed on the rear surface of the member 3 with a He—Ne laser ray while a DC voltage of 1.9 V was applied between the working and counter electrodes with the potentiostat source.

After the process was completed to form an image, the image supporting member was removed out of the solution, and then it showed that a magenta image of a high quality having an optical image density of 1.26 was formed on the surface of the member 3.

Example 6

The same electrodeposting dye solution was prepared, and the same recording process was conducted as Example 1. Then, the image supporting member was removed out of the dye solution bath, and then plain paper was put on the surface of the member 3. Over the paper, corona discharge was performed at +6 KV, and then the plain paper and image supporting member 3 were sandwiched between a pair of rubber rolls, pressed at a line pressure of 400 g/cm, and fed by rotation of the rolls. Immediately after the press, the plain paper was stripped off from the image supporting member 3 to obtain a magenta transferred image having an optical image density of 1.25 on the plain paper.

Example 7

The same dye electrodeposition solution was used as prepared in Example 2.

The same apparatus as that of Example 2 (FIG. 7) was used. An image signal was inputted to a photoimage inputting portion placed on the rear surface of the member with a He—Ne laser ray while a DC pulse voltage of 2.5 V (pulse width 2 ms/pulse cycle 3 ms) was applied between the working and counter electrodes with the potentiostat source. In this procedure, a propeller for stirring was immersed in the solution bath, and printing recording was conducted while the solution in the bath was slightly stirred.

After the process was completed to form an image, the image supporting member was removed from the solution, and then it verified that an image of a high quality having an optical image density of 1.25 was formed on the surface of the member 3. It was verified that the dispersion in optical density of the solid parts σ was 0.04.

On the other hand, image recording was conducted in the same manner as in Example 7 except that the stirring in the bath was not conducted. The optical image density of the resulting image was 1.33 and the dispersion in optical density of the solid parts σ was 0.07.

From the above description, stirring of the electrodeposition dye solution in the solution bath was useful for improving optical image density and uniformity of an image.

Example 8

The same dye electrodeposition solution was used as prepared in Example 2.

The same apparatus as that of Example 2 (FIG. 7) was used. An image signal was inputted to a photoimage inputting portion placed on the rear surface of the member with a He—Ne laser ray while a DC pulse voltage of 2.3 V (pulse width 2 ms/pulse cycle 3 ms) was applied between the working and counter electrodes by the potentiostat source. In this procedure, a thermostat was immersed in the solution bath, and printing recording was conducted at constant temperature with controlling the temperature of the solution in the bath to be kept at 40° C.

After the process was completed to form an image, the image supporting member was removed out of the solution, and then it showed that an image of a high quality having an optical image density of 1.26 was formed on the surface of the member 3. It verified that the dispersion in optical density of the solid parts σ was 0.04.

On the other hand, image recording was conducted in the same manner as in Example 8 except that the controlling of the solution temperature to be kept at 40° C. was not conducted. The optical image density of the resulting image was 1.30 and the dispersion in optical density of solid parts σ was 0.07.

From the above description, controlling the solution temperature of the dye solution in the dye electrodeposition solution bath to be constant was useful for improving optical image density and uniformity of an image.

Example 9

In the same way as in Example 2, an electrodeposting aqueous dye solution was prepared. After the image recording process, the image supporting member was removed from this solution to form an image of dye-precipitated on the member. Plain paper was put on the surface of the member 3. The plain paper and image supporting member 3 were sandwiched between a conductive rubber roll and an insulator rubber roll, pressed at a line pressure of 500 g/cm while a bias voltage of +400 V was applied to the conductive rubber roll, and fed by rotation of the rolls. Immediately after feeding these, the plain paper was stripped off from the image supporting member to obtain a transferred image having an optical image density of 1.31 on the plain paper.

After that, the untransferred material remaining on the image supporting member 3 was removed and cleaned off from the member with a rubber blade. By this step, the surface state of the member 3 was returned to its initial state, so that the member 3 was recycled for making preparations for the next image recording process.

Example 10

12 parts by weight of a specific dye, compound-15 having the aforementioned chemical structure, 7 parts by weight of polyethyleneglycol, 7 parts by weight of isopropanol, and 85 parts by weight of distilled water were mixed. This mixture was stirred with a propeller for 2 hours to prepare an aqueous dye solution.

Into this solution added was dropwise a diluting mixture solution comprised of 110 parts by weight of distilled water, 20 parts by weight of glycerin, 3 parts by weight of polyethyleneglycol sodium dicarbonate, 6 parts by weight of a water-soluble acrylic resin, and 0.3 parts by weight of an anti-mold agent (Proxycel XL-2, manufactured by ICI Inc.) while the solution was stirred with a propeller. Thus, an electrodeposition dye solution was prepared. The pH of this solution was adjusted to 4.2, 6.0, 7.6, and 9.2 with a hydrochloric acid solution and a sodium hydroxide solution, respectively. The starting point of the dye precipitation in this solution was a pH of 5.3.

As shown in FIG. 1, the image supporting member 3 wherein an image signal could be inputted from its rear surface and wherein a working electrode was attached thereto was arranged inside an electrodeposition solution bath so that the rear surface of the member would be outside the bath. The counter electrode and the controlling electrode using the salt bridge were arranged inside the bath 2. This image supporting member was made of a laminated structure having, on a glass plate of a thickness of 3 mm, a transparent conductive layer of ITO, and two organic photoconductive layers in this order. The ITO conductive layer functioned as the working electrode, and the surface of the organic photoconductive layers had smoothness. The respective electrodes were electrically connected to a potentiostat source.

An image signal was inputted to a photoimage inputting portion placed on the rear surface of the member 3 while a DC voltage of 2.1 V was applied for 8 seconds between the working and counter electrodes with the potentiostat source.

After the process was completed to form an image, the image supporting member 3 was removed from the solution, and then the optical image density on the surface of the member was measured as follows: 1.41 (the solution having pH 4.2), 1.34 (the solution having pH 6.0), 1.26 (the solution having pH 7.6), and 0.73 (the solution having pH 9.2). It was verified that in the solution having pH 4.2, the dye was precipitated at the bottom of the bath and the soluble state was unstable.

As described above, the image recording method of the present invention conducts image forming by a dye depositon phenomenon on an image supporting member which can apply an electric current corresponding to an image signal to a solution of a dye having the above-mentioned chemical structure, and can conduct image forming at a given position by application of electric voltage and irradiation with a laser ray, therefore, recording excellent in resolution can be conducted, and at the same time, recording can be effected having printing properties such as high optical density, high resolution, small image thickness image structure, strong image adhesion, excellent reproducibility of half tone, high image fastness, high safety and the like.

What is claimed is:

1. An image recording method comprising the steps of:

dissolving at least one dye represented by the following general formula (I) in an aqueous liquid, placing an image supporting member and a counter electrode opposing said image supporting member in said aqueous liquid, and applying an electric current or field according to an image pattern between said image supporting member and counter electrode to electrochemically deposit an image forming material containing said dye onto a surface of the image supporting member to form an image, $$Ar^1N{=}N{-}J{-}X{-}(NR^1{-}L{-}NR^2{-}X)_n{-}J{-}N{=}N{-}Ar^2 \quad (I)$$

wherein each of $Ar^1$ and $Ar^2$ independently represents a substituted or unsubstituted aryl group, provided that at least one of $Ar^1$ and $Ar^2$ has at least one substituent selected from a —COSH group and a —COOH group; J represents a group of the following formula (j);

(j)

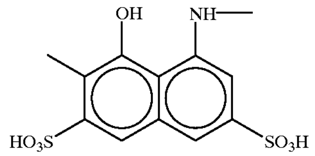

each of $R^1$ and $R^2$ independently represents a hydrogen atom, a substituted or unsubstituted alkyl, or a substituted or unsubstituted alkenyl group, L represents a bivalent organic linking group; X each independently represents a carbonyl group or a group of the formula (1), (2) or (3); n represents an integer of 0 or 1, (1)

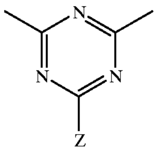

(2)

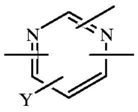

(3)

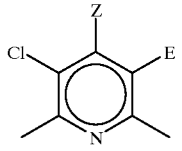

in the formulae (1) to (3), Z represents —$NR^3R^4$, —$OR^5$ or —$SR^5$; Y represents H, Cl, Z, —$SR^6$ or —$OR^6$; and E represents Cl or CN, in which $R^3$, $R^4$, $R^5$ and $R^6$ each independently represents a substituted or unsubstituted alkyl, a substituted or unsubstituted alkenyl, a substituted or unsubstituted aralkyl group, and $R^3$ and $R^4$ may form a 5- or 6-membered ring, together with a bonded N atom.

2. An image recording method according to claim 1, further comprising the step of transferring said image formed on the surface of said image supporting member onto a recording medium.

3. An image recording method according to claim 1, further comprising the step of changing a pH of said aqueous liquid existing near the surface of said image supporting member on the step of applying said current or field.

4. An image recording method according to claim 1, wherein said image supporting member comprises an optical conductive material layer containing an optical conductive material, and said image pattern is formed by imparting an optical signal to said optical conductive material layer.

5. An image recording method according to claim 1, wherein a laser ray input system is used as a means for applying a signal according to said electric current or field on said image supporting member.

6. An image recording method according to claim 1, wherein an electrothermal substance which generates heat through current flow is equipped with said image supporting member.

7. An image recording method according to claim 6, wherein said electrothermal substance is placed near the surface of the image supporting member, and a part of the surface of said image supporting member can be controlled in a heat generating condition.

8. An image recording method according to claim 1, wherein said image supporting member contains a thermoplastic resin component.

9. An image recording method according to claim 1, wherein said image supporting member is in the form of a belt.

10. An image recording method according to claim 4, wherein said image supporting member has a supporting substrate layer having a transparency of 40% or more for a light having a specific wavelength.

11. An image recording apparatus comprising:

a liquid accommodating member which accommodates an aqueous liquid in which at least one dye represented by general formula (I) is dissolved, an image supporting member placed in the aqueous liquid, a counter electrode placed in the aqueous liquid opposing on the image supporting member, and an electric source which applies an electric current or field between the image supporting member and counter electrode according to an image pattern:

$$Ar^1N{=}N{-}J{-}X{-}(NR^1{-}L{-}NR^2{-}X)_n{-}J{-}N{=}N{-}Ar^2 \quad (I)$$

wherein each of $Ar^1$ and $Ar^2$ independently represents a substituted or unsubstituted aryl group, provided that at least one of $Ar^1$ and $Ar^2$ has at least one substituent selected from a —COSH group and a —COOH group; J represents a group of the following formula (j);

(j)

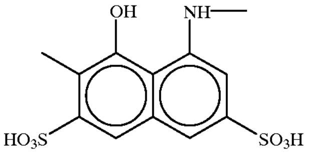

each of $R^1$ and $R^2$ independently represents a hydrogen atom, a substituted or unsubstituted alkyl, a substituted or unsubstituted alkenyl group; L represents a bivalent organic linking group; X each independently represents a carbonyl group or a group of the formula (1), (2) or (3); and n represents an integer of 0 or 1, (1)

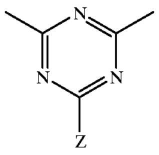

(2)

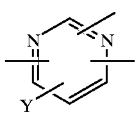

-continued (3)

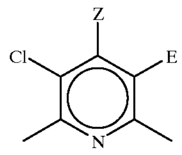

in the formulae (1) to (3), Z represents $—NR^3R^4$, $—OR^5$ or $—SR^5$; Y represents H, Cl, Z, $—SR^6$ or $—OR^6$; and E represents Cl or CN, in which $R^3$, $R^4$, $R^5$ and $R^6$ each independently represents a substituted or unsubstituted alkyl, a substituted or unsubstituted alkenyl, a substituted or unsubstituted aralkyl group, and $R^3$ and $R^4$ may form a 5- or 6-membered ring, together with a bonded N atom.

12. An image recording apparatus according to claim 11 further comprising a transfer means for allowing the image formed on the surface of said image supporting member to be transferred onto a recording medium.

13. An image recording apparatus according to claim 11, wherein said image supporting member has an optical conductive material layer containing an optical conductive material, and the apparatus has an optical signal applying means for imparting an optical signal to said optical conductive material layer to form said image pattern.

14. An image recording apparatus according to claim 11, wherein said image supporting member comprises an electrothermal substance which generates heat through current flow, and the apparatus further comprises an electric power supplying part which supplies current to the electrothermal substance.

15. An image recording apparatus according to claim 14, wherein said electrothermal substance is placed near the surface of the image supporting member.

16. An image recording apparatus according to claim 14 comprising a controlling means for controlling the heat generation condition of a part of said electrothermal substance.

17. An image recording apparatus according to claim 11, wherein said image supporting member contains a thermoplastic resin component.

18. An image recording apparatus according to claim 11, wherein said image supporting member is in the form of a belt.

19. An image recording apparatus according to claim 11, wherein said image supporting member has a supporting substrate layer having a transparency of 40% or more for a light having a specific wavelength, and an optical conductive layer containing an optical conductive material.

* * * * *